United States Patent
Allouche

(10) Patent No.: US 10,607,252 B2
(45) Date of Patent: Mar. 31, 2020

(54) METHODS AND SYSTEMS FOR TARGETED B2B ADVERTISING CAMPAIGNS GENERATION USING AN AI RECOMMENDATION ENGINE

(71) Applicant: Metadata, Inc., San Francisco, CA (US)

(72) Inventor: Gil David Allouche, San Francisco, CA (US)

(73) Assignee: Metadata, Inc., San Francisco, CA (US)

( * ) Notice: Subject to any disclaimer, the term of this patent is extended or adjusted under 35 U.S.C. 154(b) by 0 days.

(21) Appl. No.: 16/395,130

(22) Filed: Apr. 25, 2019

(65) Prior Publication Data

US 2019/0251593 A1 Aug. 15, 2019

Related U.S. Application Data

(63) Continuation-in-part of application No. 15/862,673, filed on Jan. 5, 2018, which is a continuation of
(Continued)

(51) Int. Cl.
| | | |
|---|---|---|
| *G06Q 30/02* | (2012.01) | |
| *G06Q 30/00* | (2012.01) | |
| *G06Q 10/06* | (2012.01) | |

(52) U.S. Cl.
CPC ..... *G06Q 30/0243* (2013.01); *G06Q 10/0639* (2013.01); *G06Q 30/0185* (2013.01);
(Continued)

(58) Field of Classification Search
CPC ........... G06Q 30/0243; G06Q 10/0639; G06Q 30/0185; G06Q 30/0244; G06Q 30/0251;
(Continued)

(56) References Cited

U.S. PATENT DOCUMENTS 6,115,690 A 9/2000 Wong
6,658,391 B1 12/2003 Williams et al.
(Continued)

FOREIGN PATENT DOCUMENTS

WO 2001037152 A1 5/2001
WO WO-2007092615 A2 * 8/2007 ............. G06Q 10/00
(Continued)

OTHER PUBLICATIONS

F.O. Isinkaye, Recommendation systems: Principles, methods and evaluation, 2015 (Year: 2015).*
(Continued)

*Primary Examiner* — Tarek Elchanti
(74) *Attorney, Agent, or Firm* — American Patent Agency PC; Daniar Hussain; Xiaomeng Shi

(57) ABSTRACT

Disclosed are methods and systems for generating targeted advertising campaigns for a business-to-business (B2B) company. The method comprises retrieving historical data on one or more historical experiments; determining, using a prediction engine, a prediction of a goal metric by finding a pattern in a historical metric that influences the goal metric, where the historical metric is included in the historical data; determining, using the prediction engine, correlations between one or more experimental parameters and the goal metric, based on the prediction of the goal metric; training, using the prediction engine, two or more experimental parameter models for the goal metric, based on the correlations between the one or more experimental parameters and the goal metric; generating, using a campaigns engine, one or more new experiments, each associated with the goal metric, and based on the two or more experimental parameter models; and generating, using the campaigns engine, a targeted advising campaign comprising a selected number of the new experiments.

20 Claims, 15 Drawing Sheets

Related U.S. Application Data application No. 15/689,016, filed on Aug. 29, 2017, now Pat. No. 9,886,700.

(60) Provisional application No. 62/380,956, filed on Aug. 29, 2016.

(52) U.S. Cl.
CPC ..... *G06Q 30/0244* (2013.01); *G06Q 30/0251* (2013.01); *G06Q 30/0269* (2013.01); *G06Q 30/0276* (2013.01); *G06Q 30/0282* (2013.01)

(58) Field of Classification Search
CPC ........... G06Q 30/0269; G06Q 30/0276; G06Q 30/0282
USPC ...................................................... 705/14.42
See application file for complete search history.

(56) References Cited

U.S. PATENT DOCUMENTS

| | | |
|---|---|---|
| 6,697,824 B1 | 2/2004 | Bowman-Amuah |
| 6,868,389 B1 | 3/2005 | Wilkins et al. |
| 7,003,476 B1 | 2/2006 | Samra et al. |
| 7,047,206 B1 | 5/2006 | Schultze |
| 7,136,448 B1 | 11/2006 | Venkataperumal et al. |
| 7,246,083 B2 | 7/2007 | Bibelnieks et al. |
| 7,340,411 B2 | 3/2008 | Cook |
| 7,430,535 B2 | 9/2008 | Dougherty et al. |
| 7,499,870 B1 | 3/2009 | Petrossi |
| 7,844,489 B2 | 11/2010 | Landesmann |
| 7,917,384 B2 | 3/2011 | Hubsher |
| 8,135,607 B2 | 3/2012 | Williams et al. |
| 8,271,313 B2 | 9/2012 | Williams et al. |
| 8,296,174 B2 | 10/2012 | Raffel et al. |
| 8,700,460 B2 | 4/2014 | Khetrapal et al. |
| 8,762,193 B2 | 6/2014 | Maga et al. |
| 8,825,509 B2 | 9/2014 | Yerkes et al. |
| 9,082,087 B2 | 7/2015 | Fernandez et al. |
| 9,129,292 B2 | 9/2015 | Almeida et al. |
| 9,215,423 B2 | 12/2015 | Kimble et al. |
| 9,419,850 B2 | 8/2016 | Longo |
| 9,665,885 B1 | 5/2017 | Allouche |
| 2003/0004787 A1 | 1/2003 | Tripp |
| 2003/0179870 A1 | 9/2003 | Hilaire et al. |
| 2004/0093343 A1 | 5/2004 | Lucas et al. |
| 2004/0225555 A1 | 11/2004 | Persidis et al. |
| 2005/0060313 A1 | 3/2005 | Naimat et al. |
| 2006/0047571 A1 | 3/2006 | Garcia et al. |
| 2006/0074747 A1 | 4/2006 | Kline et al. |
| 2006/0100894 A1 | 5/2006 | Weiner et al. |
| 2006/0242000 A1 | 10/2006 | Giguiere |
| 2007/0233566 A1 | 10/2007 | Zlotin |
| 2008/0172344 A1 | 7/2008 | Eager et al. |
| 2009/0030801 A1 | 1/2009 | Meggs |
| 2009/0112687 A1 | 4/2009 | Blair et al. |
| 2009/0164306 A1 | 6/2009 | Petrossi |
| 2009/0171761 A1 | 7/2009 | Noy et al. |
| 2010/0274661 A1 | 10/2010 | Aaltonen |
| 2010/0332290 A1 | 10/2010 | Narvaez |
| 2010/0332291 A1 | 12/2010 | Smith |
| 2011/0066562 A1 | 3/2011 | Stapleton et al. |
| 2011/0078073 A1 | 3/2011 | Annappindi |
| 2011/0238485 A1 | 9/2011 | Haumont et al. |
| 2011/0282730 A1 | 11/2011 | Tarmas |
| 2012/0130794 A1 | 5/2012 | Strieder |
| 2012/0246010 A1 | 9/2012 | Foth et al. |
| 2012/0253924 A1 | 10/2012 | Giese et al. |
| 2012/0271709 A1 | 10/2012 | Ogawa |
| 2012/0278091 A1 | 11/2012 | Yaseen et al. |
| 2013/0041749 A1 | 2/2013 | Petrossi |
| 2013/0157609 A1 | 6/2013 | Vainik et al. |
| 2013/0173638 A1 | 7/2013 | Ben-Reuven |
| 2013/0204823 A1 | 8/2013 | Treiser |
| 2013/0246160 A1 | 9/2013 | Farahat |
| 2013/0253981 A1 | 9/2013 | Lipka et al. |
| 2013/0311235 A1 | 11/2013 | Jaros et al. |
| 2014/0058826 A1 | 2/2014 | Ogawa |
| 2014/0081740 A1 | 3/2014 | Lipka et al. |
| 2014/0164084 A1 | 6/2014 | Battles et al. |
| 2014/0278759 A1 | 9/2014 | Lawson et al. |
| 2015/0019305 A1 | 1/2015 | Gorawala |
| 2016/0132953 A1 | 5/2016 | Davar et al. |
| 2016/0189163 A1 | 6/2016 | Jonsson et al. |
| 2016/0212266 A1 | 7/2016 | Soundar |
| 2016/0314491 A1 | 10/2016 | Shani et al. |
| 2016/0314498 A1 | 10/2016 | Srivastava et al. |
| 2016/0335659 A1 | 11/2016 | Lewis et al. |
| 2016/0357173 A1* | 12/2016 | Foschini ................ G16H 10/20 |

FOREIGN PATENT DOCUMENTS

| | | |
|---|---|---|
| WO | 2007112411 A2 | 10/2007 |
| WO | 2011019731 A2 | 2/2011 |
| WO | 2015001558 A1 | 1/2015 |

OTHER PUBLICATIONS

Jochemsen, M. C., "An exploration of content-driven commerce," University of Twente website, 2014, available at: http://essay.utwente.nl/66408/, last accessed on Sep. 26, 2016.

Murphy, Lincoln, "Ideal Customer Profile Framework," blog article, originally published in 2014, available at: http://sixteenventures.com/ideal-customer-profile, last accessed on Apr. 4, 2017.

Subramanyan, Vignesh, "Stop Yelling at Prospects: How to Build an Ideal Customer Profile," Business 2 Community Blog article, Nov. 2, 2016, available at: http://www.business2community.com/marketing/stop-yelling-prospects-build-ideal-customer-profile-01696247#xJGvQbxeIE2zHQxU.97, last accessed on Apr. 4, 2017.

Casey, Steven, et al., "Vendor Landscape: Account-Based Marketing, Q4 2016, Point Solutions Proliferate Amid Claims of Platform Leadership," Report, Oct. 18, 2016, Forrester Research, Cambridge, MA, US.

* cited by examiner

400

412   414

| | | |
|---|---|---|
| EMAIL | gil@metadata.io | ← 420 |
| FULL NAME | Gil Allouche | |
| JOB TITLE | CEO | |
| COMPANY | Metadata | |
| DOMAIN | Metadata.io | |
| INDUSTRY | Computer Software | |
| GROUPS | Marketing, B2B, Entrepreneurship | |
| SKILLS | Programming, Artificial Intelligence, | |
| TECHNOLOGIES | ASP.NET, C#, C++, SQL, Pixel, Optimizely, WordPress, Cloudera, CDH, ElasticSearch | |
| REVENUE | $1,128,500 | |
| NUMBER OF EMPLOYEES | 10 | |
| GENDER | Male | |
| INCOME | $100,000 | |
| COUNTRY | United States | |
| STATE | CA | |
| SENIORITY | Executive | |
| SOCIAL CLOUT | High | ← 410 |
| HOURS ACTIVE | 9pm – 3am | |
| OPPORTUNITY AMOUNT $ | $35,000 | |
| OPPORTUNITY STATUS | CLOSED WON | |
| BRANDS | Fox, Amazon, IKEA | |
| ETHNICITY | Middle- Eastern | |
| PROFESSIONAL CONNECTIONS | 5.294 | |
| EDUCATION | B.Sc. Comp. Sci. (2) MBA | |
| PROFESSIONAL EXPERIENCE | (0) Metadata.io (1) Qubole (2) Karmasphere (3) TIBCO Spotfire (4) SAP | |
| VISITORS PER MONTHS | 8,420 | |
| GROWTH MOM | 25% | |
| OTHER KEYS | (Facebook) (LinkedIn) (Twitter) (website) (IP Address) (other emails) | |

| | | |
|---|---|---|
| CEO RANKING (GLASSDOOR – PUBLIC WEB) | 3.6 | |
| ALEXA RANKING | 4,249,123 | |
| COMPANY FACEBOOK | https://www.facebook.com/metadata.io/ | |
| COMPANY LINKEDIN | https://www.linkedin.com/company/metadata | |
| PERSONAL LINKEDIN | https://www.linkedin.com/in/gilallouche/ | ← 450 |
| PERSONAL TWITTER | Address: https://twitter.com/gilallouche<br>Tweets Count: 642<br>Followers Count: 512<br>Likes: 117 | |

Fig. 4

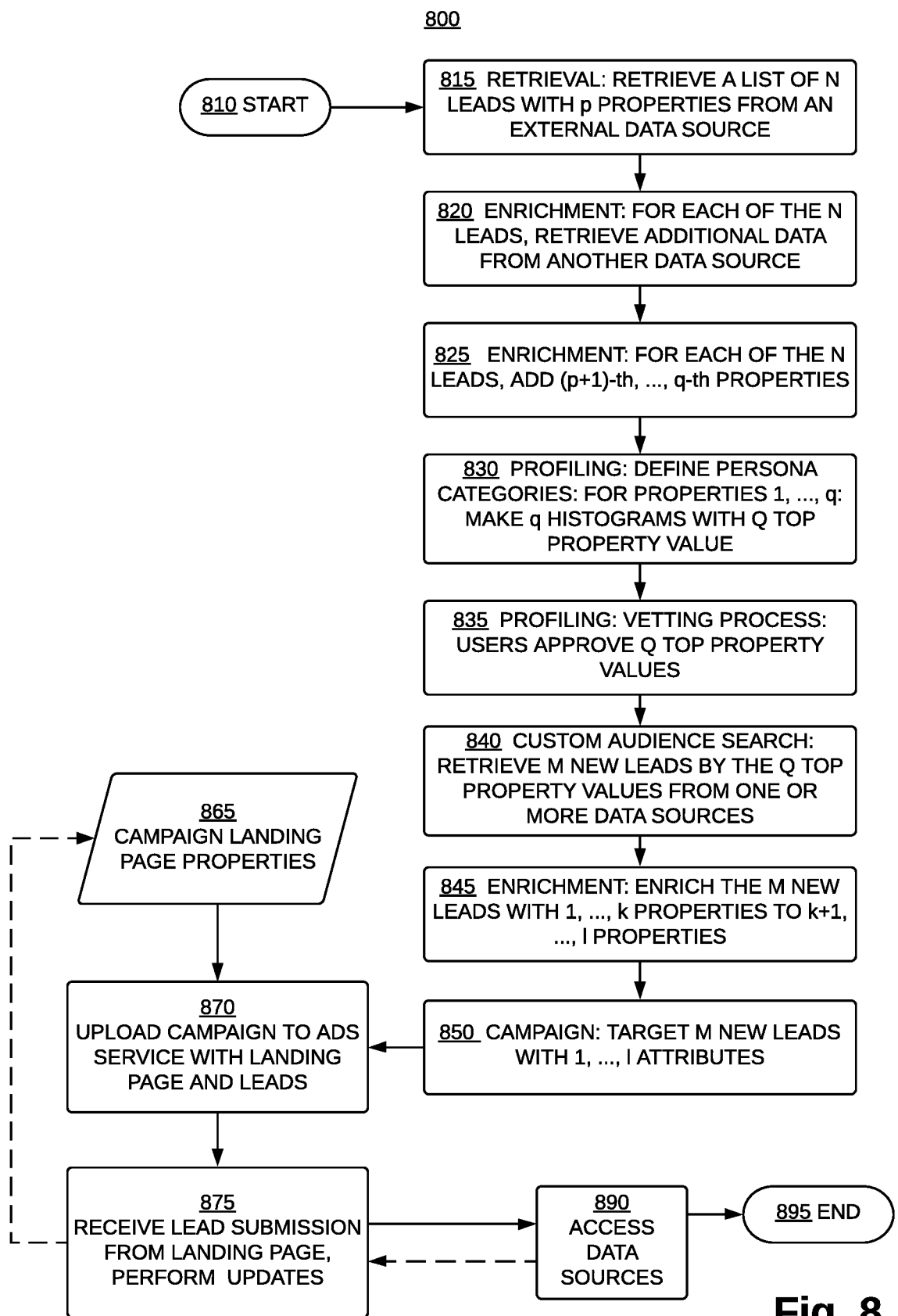

900

910 EXEMPLARY CAMPAIGN, MICRO-CAMPAIGN, OR TEST CAMPAIGN

920 CAMPAIGN

Spend Cap  2000  $
Start Date  08/08/2017   End Date  09/01/2017
Facebook Pages   Lightbend

930 TARGETING

Hubspot Landing Pages   marketing automation compar...
Hubspot Thank You Pages   thank-you-marketing-automati...
Custom Audiences   Lookalike (US, 2%) - Align_Pilot_Lookalike_Audience_930-EDA21179(3915900)

940 CREATIVE

Ad Headline   Example headline
Ad Text   Example text
Ad Description   Example description
Website URL   http://offers.metadata.io/marketing-automation-
Display URL   http://offers.metadata.io

950 AD CREATIVES

Choose File   No file chosen

CREATE CAMPAIGN

1110 START

1120 RETRIEVE AN ICP PERSONIFYING AN IDEAL CUSTOMER, THE ICP COMPRISING ICP BUSINESS AND PERSONA ATTRIBUTE FIELDS, THE ICP PERSONA ATTRIBUTE FIELDS IDENTIFY ONE OR MORE PERSONAL ROLES WITHIN A COMPANY IDENTIFIED BY THE ICP BUSINESS ATTRIBUTE FIELDS

1130 GENERATE CANDIDATE LEADS BY: RETRIEVING CANDIDATE LEADS FROM ONE OR MORE LEAD DATA SOURCES, WHERE EACH CANDIDATE LEAD MATCHES THE ICP, AND ENRICHING EACH CANDIDATE LEAD WITH ENRICHMENT DATA RETRIEVED FROM ONE OR MORE ENRICHMENT DATA SOURCES

1140 GENERATE ONE OR MORE TEST CAMPAIGNS, WHERE EACH TEST CAMPAIGN IS ASSOCIATED WITH A CAMPAIGN COST, ONE OR MORE CHANNEL ADVERTISING PARTNERS, ONE OR MORE LANDING PAGES, AND A GROUP OF TEST CANDIDATE LEADS

1150 DIRECT EACH TEST CAMPAIGN TO THE ASSOCIATED GROUP OF TEST LEADS, USING THE ONE OR MORE ASSOCIATED CHANNEL ADVERTISING PARTNERS

1160 RECEIVE FEEDBACK INFORMATION ON EACH TEST CAMPAIGN FROM THE ASSOCIATED GROUP OF TEST LEADS, THROUGH ONE OR MORE OF THE ASSOCIATED LANDING PAGES, WHERE EACH TEST LEAD WHO RESPONDS AFFIRMATIVELY TO ONE OF THE ASSOCIATED LANDING PAGES IS MARKED AS AN ACQUIRED LEAD

1170 COMPUTING A TEST CAMPAIGN SCORE FOR EACH TEST CAMPAIGN, BASED ON THE NUMBER OF THE ACQUIRED LEADS ACQUIRED THROUGH THE TEST ADVERTISING CAMPAIGN, AND A CAMPAIGN COST PER LEAD (CPL)

1180 GENERATE AND DIRECT A TARGETED ADVERTISING CAMPAIGN TO THE CANDIDATE LEADS, WHERE THE TARGETED ADVERTISING CAMPAIGN COMPRISES ONE OR MORE MICRO-CAMPAIGNS, WHERE EACH MICRO-CAMPAIGN REPLICATES A TEST CAMPAIGN WITH A TEST CAMPAIGN SCORE EXCEEDING A CAMPAIGN SCORE THRESHOLD, AND WHERE EACH MICRO-CAMPAIGN IS DIRECTED TO A SUBSET OF THE CANDIDATE LEADS THAT MATCH A PROFILE OF THE TEST LEAD GROUP ASSOCIATED WITH THE REPLICATED TEST CAMPAIGN

1190 GENERATE THE OPT-IN LEADS BY SELECTING CANDIDATE LEADS THAT RESPOND AFFIRMATIVELY TO THE TARGETED ADVERTISING CAMPAIGN

1195 END

```
    ┌─────────────┐
    │ 1210        │
    │ START       │
    └──────┬──────┘
           ▼
```

1220 RETRIEVE HISTORICAL DATA ON ONE OR MORE HISTORICAL EXPERIMENTS

1230 DETERMINE, USING A PREDICTION ENGINE, A PREDICTION OF A GOAL METRIC BY FINDING A PATTERN IN A HISTORICAL METRIC THAT INFLUENCES THE GOAL METRIC, WHEREIN THE HISTORICAL METRIC IS INCLUDED IN THE HISTORICAL DATA

1240 DETERMINE, USING THE PREDICTION ENGINE, CORRELATIONS BETWEEN ONE OR MORE EXPERIMENTAL PARAMETERS AND THE GOAL, BASED ON THE PREDICTION OF THE GOAL METRIC

1250 TRAIN, USING THE PREDICTION ENGINE, TWO OR MORE EXPERIMENTAL PARAMETER MODELS FOR THE GOAL METRIC, BASED ON THE CORRELATIONS BETWEEN THE ONE OR MORE EXPERIMENTAL PARAMETERS AND THE GOAL METRIC

1260 GENERATE, USING A CAMPAIGNS ENGINE, ONE OR MORE NEW EXPERIMENTS, EACH ASSOCIATED WITH THE GOAL METRIC, AND BASED ON THE TWO OR MORE EXPERIMENTAL PARAMETER MODELS

1270 GENERATE, USING THE CAMPAIGNS ENGINE, A TARGETED ADVISING CAMPAIGN COMPRISING A SELECTED NUMBER OF THE NEW EXPERIMENTS.

```
    ┌─────────────┐
    │ 1295        │
    │ END         │
    └─────────────┘
```

Fig. 12

METHODS AND SYSTEMS FOR TARGETED B2B ADVERTISING CAMPAIGNS GENERATION USING AN AI RECOMMENDATION ENGINE

REFERENCE TO RELATED APPLICATIONS

This application is a continuation-in-part of U.S. Ser. No. 15/862,673, filed on Jan. 5, 2018, entitled "Methods and Systems for B2B Demand Generation with Targeted Advertising Campaigns and Lead Profile Optimization Based on Target Audience Feedback," which itself is a continuation of and claims the benefit of priority to U.S. Ser. No. 15/689,016, filed on Aug. 29, 2017, entitled "Methods and Systems for B2B Demand Generation with Targeted Advertising Campaigns and Lead Profile Optimization Based on Target Audience Feedback," issued as U.S. Pat. No. 9,886,700, issued on Feb. 6, 2018, which itself is a non-provisional of and claims the benefit of provisional application U.S. Ser. No. 62/380,956, filed on Aug. 29, 2016, and entitled "Methods and Systems Utilizing an Engine for Targeted Demand Generation Based on Ideal Customer Profiles," the entire disclosures of all of which are hereby incorporated by reference in their entireties herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are in the field of customer profiling and targeted advertising, and pertain particularly to methods and systems for targeted demand generation.

BACKGROUND OF THE INVENTION

The statements in the background of the invention are provided to assist with understanding the invention and its applications and uses, and may not constitute prior art.

Business-to-business (B2B) companies struggle to generate a predictable volume of high-quality leads. A typical conversion rate for a B2B marketing campaign is only about 3%; and furthermore, not all leads are created equal. That is, not all converted leads have the same value or ease of acquisition, and increasing lead volume alone does not necessarily bring higher lead-to-opportunity conversions or closed sales further down the sales funnel. Even though correlated, marketing activities do not directly equate to sales outcomes.

One cause for such unproductive and ineffective lead generation is the open-loop nature of conventional B2B marketing strategies, which are often viewed in isolation, separately from sales functions. There are many marketing activities that generate leads, yet it is hard to consistently source leads generated to specific acquisition channels. For example, marketing acquisition channels include, but are not limited to, events, content marketing, Search Engine Optimization (SEO), advertising, emails, webinars, referrals, and many others. Depending on the particular industry of interest and the amount of resources invested, different acquisition channels provide leads with different lead-to-opportunity conversion rates.

Another difficulty in generating a consistent number of leads of a certain quality with certain prospect profiles is advertising and data fraud, made easy by the anonymous nature of digital advertising. Advertising fraud may result from the use of bots that mimic the activities of human browsers, from inflated advertising counts via pixel stuffing and ad stacking, or from inaccurate or insufficient data collection by advertising channels, such as via cookies by Facebook, LinkedIn, or Google, or by other means. Data fraud or "dirty data" may result from inaccurate data input or collection, such as when unverified or fraudulent ages, locations, or identities are extracted from social media networks. In general, advertising tends to generate a wide spectrum of leads in terms of quality, with large fluctuations in cost spent per lead.

Moreover, it is common practice for B2B companies to utilize sales force automation (SFA) systems designed based on conventional marketing strategies developed before the advent of the social networking age. Such tools streamline the business process, but are not capable of seizing on as many potential opportunities as possible. SFA systems use software to automate the business tasks of sales, including order processing, contact management, information sharing, inventory monitoring and control, order tracking, customer management, sales forecast analysis, employee performance evaluation, and even marketing. SFA is often carried out using Customer Relationship Management (CRM) software. Many CRM and SFA systems were designed in the 1990s, before social networking became ubiquitous, and thus such systems often reflect the conventional way that business operates, where a salesperson initiates an action, instead of having the customer taking initiative. In the case where system data are not up-to-date, there would be further lags and missed opportunities. Also, while some systems generate lookalike clients to existing customers, they do so by relying on internal information only, and are thus limited in capturing potential clients not already in the system. Alternatively, some systems generate lookalikes based on external data sources, but are usually limited to simple demographic data.

Furthermore, marketers often fall under the false impression that all digital marketing tools necessary for growth and for generating new leads roll up under the hood of marketing automation. This misconception leaves many marketers with sophisticated tools to automate the middle of their funnel, yet without generating new leads to nurture in the first place. As a result, marketers end up buying lists of email addresses to nurture instead of generating inbound leads, which are customer initiated, and reflect a higher level of customer interest. While outbound marketing to large email lists seems like a quick fix, this is not a long-term solution for sustained success, nor does it create any fertile ground for a healthier, longer relationship between B2B companies and their future customers. Therefore, obtaining reliable business client leads with conventional marketing and sales automation software is often time consuming and expensive.

In addition, marketers often target companies and personas that do not reflect their ideal customer profile (ICP) and end up spending marketing budgets on unqualified prospects, wasting company funds and the time of their sales counterparts.

Therefore, in view of the aforementioned difficulties, it would be an advancement in the state of the art to provide systems and methods for generating high-quality business leads for B2B companies.

It is against this background that the present invention was developed.

BRIEF SUMMARY OF THE INVENTION

The inventors of the present invention have created methods and systems for targeted B2B advertising campaigns generation using an AI recommendation engine.

More specifically, in one aspect, one embodiment of the present invention is a method executable by a hardware processor which executes program code from a non-transitory storage medium, the method for generating targeted advertising campaigns for a business-to-business (B2B) company, comprising the steps of retrieving historical data on one or more historical experiments; determining, using a prediction engine, a prediction of a goal metric by finding a pattern in a historical metric that influences the goal metric, where the historical metric is included in the historical data; determining, using the prediction engine, correlations between one or more experimental parameters and the goal metric, based on the prediction of the goal metric; training, using the prediction engine, two or more experimental parameter models for the goal metric, based on the correlations between the one or more experimental parameters and the goal metric; generating, using a campaigns engine, one or more new experiments, each associated with the goal metric, and based on the two or more experimental parameter models; and generating, using the campaigns engine, a targeted advising campaign comprising a selected number of the new experiments.

In some embodiments, at least one of the one or more historical experiments is currently running.

In some embodiments, at least one of the one or more historical experiments was for the B2B company. In some embodiments, at least one of the one or more historical experiments was for a company other than the B2B company.

In some embodiments, the historical data comprises creatives from one or more companies in an industry similar to the B2B company, or to a target audience similar to the B2B company.

In some embodiments, the experimental parameters is selected from the group consisting of bid, daily budget, and duration of experiment, and where the goal metric is selected from the group consisting of customer conversion rate, and budget.

In some embodiments, the selected new experiments collectively optimize the goal metric.

In some embodiments, the retrieving of historical data comprises scanning client websites for advertising content. In some embodiments, the retrieving of historical data comprises scanning for competitor campaigns.

In another aspect, one embodiment of the present invention is a system for generating targeted advertising campaigns for a business-to-business (B2B) company, comprising a processor, and a non-transitory, computer-readable storage medium for storing program code. The program code encodes at least a campaigns engine, and a prediction engine. The program code when executed by the processor causes the processor to execute a process comprising the aforementioned steps.

In another aspect, one embodiment of the present invention is a non-transitory computer-readable storage medium for generating targeted advertising campaigns for a business-to-business (B2B) company, the storage medium comprising program code stored thereon, where the program code encodes a campaigns engine and a prediction engine, and when executed by a processor, causes the processor to execute a process comprising the aforementioned steps.

In yet another aspect, one embodiment of the present invention is a method executable by a hardware processor which executes instructions from a non-transitory storage medium, the method for generating targeted advertising campaigns for a business-to-business (B2B) company, comprising steps of: retrieving, utilizing a leads engine, an ideal customer profile (ICP) comprising one or more ICP attribute fields personifying an ideal customer, where an AI operator automatically generates the ICP attribute fields based on an analysis of high-conversion customers from historical data; generating, utilizing the leads engine, candidate leads by retrieving a plurality of candidate leads from one or more lead data sources based on the ICP attribute fields; generating, utilizing a campaigns engine, one or more test campaigns, where each test campaign is associated with a campaign cost and an associated group of test leads, and where the associated group of test leads is a small subset of the candidate leads, where the AI operator automatically generates at least one of the one or more test campaigns based on analysis of high-conversion test campaigns from historical performance; scoring, utilizing the campaigns engine, each test campaign by generating a test campaign score for each test campaign, based on a number of acquired leads acquired through each test campaign and a campaign cost per lead (CPL), where the number of acquired leads is calculated based on feedback information received from each test campaign from the associated group of test leads, and where each test lead who responds affirmatively to one of the test campaigns is marked as an acquired lead; tracking, utilizing the AI operator, a performance of each test campaign in order to automatically generate targeted advertising campaigns based on performance of the test campaigns; generating, utilizing the campaigns engine, one or more targeted advertising campaigns to a larger subset of the candidate leads based on the test campaign scores of the test campaigns; and tracking performance of the one or more targeted advertising campaigns and automatically repeating one or more of the targeted advertising campaigns based on historical performance data, where more successful targeted advertising campaigns, as measured by customer conversion rates, are repeated, and where less successful advertising campaigns as measured by customer conversion rates are discarded and new test advertising campaigns are generated, and subsequently new targeted advertising campaigns are generated.

In some embodiments, the method further comprises the steps of: serving the acquired leads from the campaigns engine to a Customer Relationship Management (CRM) system; and retrieving opportunity data on the acquired leads from the CRM to the campaigns engine, where the scoring of a test campaign by the campaigns engine is further based on opportunity amounts of closed opportunities for the acquired leads acquired by the test campaign.

In some embodiments, a profiler module generates the ICP by: retrieving a plurality of qualified leads from a Customer Relationship Management (CRM) system, where each qualified lead comprises a plurality of attribute fields, where each attribute field has an attribute value, and where each qualified lead has at least one attribute field having an attribute value satisfying a qualification condition; enriching the plurality of qualified leads with enrichment data retrieved from one or more enrichment data sources to generate a plurality of enriched leads, where each enriched lead comprises a plurality of business attribute fields and a plurality of persona attribute fields; computing a criterion attribute value score for each of a plurality of criterion attribute fields of each enriched lead, wherein the plurality of criterion attribute fields is a subset of the plurality of attribute fields; computing a lead score for each enriched lead, based on the criterion attribute value scores for the enriched lead; computing a property value score for each property attribute value of each of a plurality of property attribute fields, based on the computed lead scores, where the plurality of property attribute fields is a subset of the plurality of attribute fields; and generating ICP attribute fields for the ICP, based on the computed property value scores.

In some embodiments, the method further comprises updating the ICP, utilizing a profiler module, based on the acquired leads by: computing a criterion attribute value score for each of a plurality of criterion attribute fields of each acquired lead, where the plurality of criterion attribute fields is a subset of the plurality of attribute fields; computing a lead score for each acquired lead, based on the criterion attribute value scores for the acquired lead; computing a property value score for each property attribute value of each of a plurality of property attribute fields, based on the computed lead scores, wherein the plurality of property attribute fields is a subset of the plurality of attribute fields; and updating ICP attribute fields for the ICP, based on the computed property value scores.

In some embodiments, the method further comprises obtaining, utilizing the profiler module, a plurality of primary keys for the plurality of qualified leads; obtaining, utilizing the profiler module, a plurality of secondary keys using the plurality of primary keys as keys into one or more enrichment data sources, where the plurality of secondary keys serves as primary keys for the enrichment data sources; and enriching, utilizing the profiler module, each of the plurality of candidate leads with enrichment data retrieved from the one or more enrichment data sources, wherein the enriching of each candidate lead comprises populating one or more attribute fields of the candidate lead with attribute values retrieved from the enrichment data sources using the plurality of secondary keys.

In some embodiments, the test campaign score computed for each test campaign comprises one or more components selected from the group consisting of a number of impressions, a number of clicks, visit-to-form-submission conversion percentage, the campaign cost, the CPL, an opportunity amount, and a probability and a time of closing the opportunity; the visit-to-form-submission conversion percentage is computed by dividing the number of the acquired leads acquired through the test campaign by a number of test leads in the test lead group associated with the test campaign; and the CPL is computed by dividing the campaign cost associated with the test campaign by the number of the acquired leads acquired through the test campaign.

In some embodiments, the computing of the weight for each attribute value of each attribute field is by generating a histogram of attribute values for each attribute filed, over all enriched leads, and the generating of the ICP attribute fields for the ICP is by assigning the mode of each generated histogram to the corresponding ICP attribute field.

In some embodiments, each of the lead data sources is selected from the group consisting of a system database, one or more third-party databases, and the one or more channel advertising partners.

In yet another aspect, the present invention is a computerized server comprising at least one processor, memory, and computer codes embodied on the memory, the computer codes which when executed causes the processor to execute a process comprising the aforementioned steps.

Yet other aspects and embodiments of the present invention include the methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 4 is an illustrative record showing attribute fields of a contact within a company, according to one embodiment of the present invention.

FIG. 8 is a flowchart illustrating a process for generating opt-in business leads utilizing audience customization and targeted marketing campaigns, according to one embodiment of the present invention.

FIG. 9 is an exemplary campaign setup page, according to one embodiment of the present invention.

FIG. 11 is an illustrative flowchart for a process to generate opt-in business leads, according to one embodiment of the present invention.

FIG. 12 is an illustrative flowchart for a process to generate targeted advertising campaigns, according to one embodiment of the present invention.

DETAILED DESCRIPTION OF THE INVENTION

Illustrative Definitions

Figure 1:
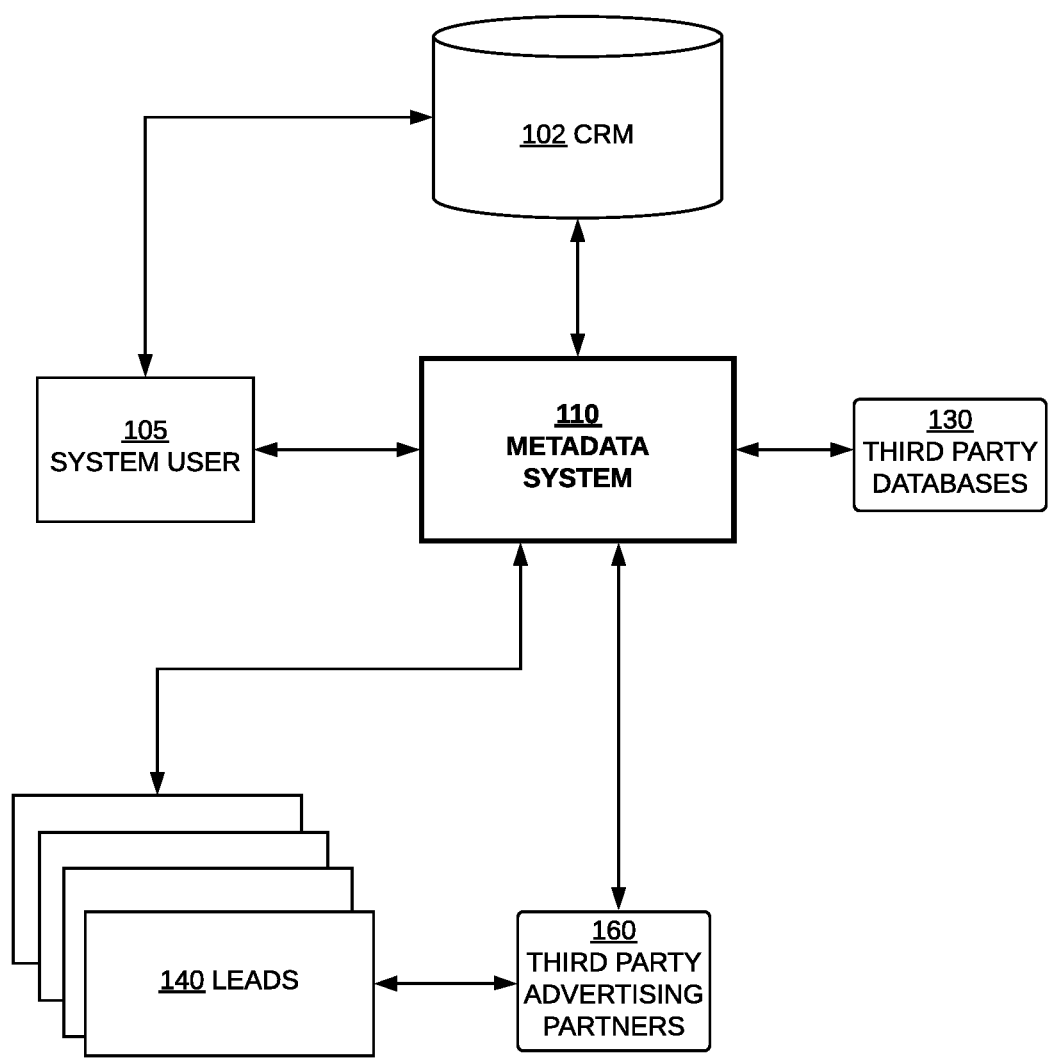
FIG. 1 is an illustrative schematic diagram showing a business lead generation framework, according to one embodiment of the present invention.

Some illustrative definitions are provided to assist in understanding the present invention, but these definitions are not to be read as restricting the scope of the present invention. The terms may be used in the form of nouns, verbs or adjectives, within the scope of the definitions.

"METADATA" is a trademark name carrying embodiments of the present invention, and hence, the aforementioned trademark name may be interchangeably used in the specification and drawings to refer to products/services offered by embodiments of the present invention. The term METADATA may also be used in this specification to describe the overall system and/or server embodying the present invention, processes performed by embodiments of the present invention, as well as the company that provides such services and systems.

"User" or "System User" refers to an end user of embodiments of the present invention, or a user or customer of METADATA. A user may be a person, a device, a company or business that the person or device belongs to, or a sales or marketing team within the company or business.

"Company" or "Business" is an organization or entity where goods and services are exchanged for one another, for money, or for achieving other objectives. A company or a business may be privately owned, not-for-profit, or state-owned, and it may take the form of sole proprietorship, partnership, limited liability, corporation, or public limited company. In the present disclosure, a company may also be referred to as an account in user's CRM data.

"Business client", "Client", "Business customer", or "Customer" is a customer of a user of METADATA. In the present disclosure, a business client, client, business customer, or customer may refer to either a company or business, or the persons within.

"Lead", "Contact", or "Prospect" is a prospective consumer of a product or service, and a potential or an actual existing customer of a user of METADATA. An existing customer whom the user has previously served may be suitable for new products or services currently being marketed, thus may be potential leads and prospects for targeted marketing campaigns. A lead, contact, or prospect may refer to individuals, but may alternatively refer to the company or business an individual belongs to.

"Direct candidate lead" is a lead obtained by directly comparing attributes of leads from various data sources to a given Ideal Customer Profile (ICP), and selecting those leads that match the ICP with a high match rate.

"Qualified lead" is a lead that meets one or more qualification conditions or criteria. For example, a qualified lead may be an existing customer of a given company, and may be associated with opportunity amounts exceeding a given threshold. Alternatively, a qualified lead may be associated with future deals having a positive probability of being closed and won by a user of METADATA, where such positive chance may be high, above a given probabilistic threshold.

"Opt-in lead" is a lead that affirmatively or positively responds to marketing or advertising information. Responses from opt-in leads may also be called feedback, and may be collected through any new or conventional channels such as landing pages, social networks, for example, through lead generation campaigns, emails, mailing list signups, webpage cookies, or phone calls. An opt-in lead may also be called an acquired lead in some embodiments of the present invention.

"Persona" or "Client Persona" is a role or decision-making category held by one or more individuals within a company or business. Exemplary personas include, but are not limited to, CEO, CTO, CFO, Manager, Director, Economic Decision Maker (EDM), Technical Decision Maker (TDM), and Business Decision Maker (BDM). Such roles are generally well understood and may be defined by demographic signals such as job title, seniority, professional group, skillset, education and other demographic, technographic or buyer intent signals. Those roles have defined responsibilities with respect to a given business, and may be reached out to by METADATA for targeted marketing or advertising campaigns. For example, a B2B customer may have complex internal purchasing agents as personas. Such internal purchasing agents include, but are not limited to, CEO, CTO, CFO, marketing manager, sales director, director of product, project manager, program manager, programmer, analyst, database administrator, designer, chief architect, and software engineer. A persona describes, and may be specified by, the attributes of an individual. However, a "persona" is not necessarily equivalent to an "individual" in the context of targeted marketing campaigns, which are tailored for specific company roles or roles within different companies. In one example, a company may have only one employee, who serves as the CEO, CTO, and CFO concurrently. In this case, there are three personas, but just one individual employee who holds all three titles.

"Profile" or "Customer Profile" comprises attribute fields to describe a business client or a set of business clients, and includes two parts: company, and persona. Exemplary company attributes include, but are not limited to, industry, revenue, number of employees, brands, and growth. Exemplary persona attributes are as described above, and may include, for example, age, gender, title, and education level.

Figure 7:
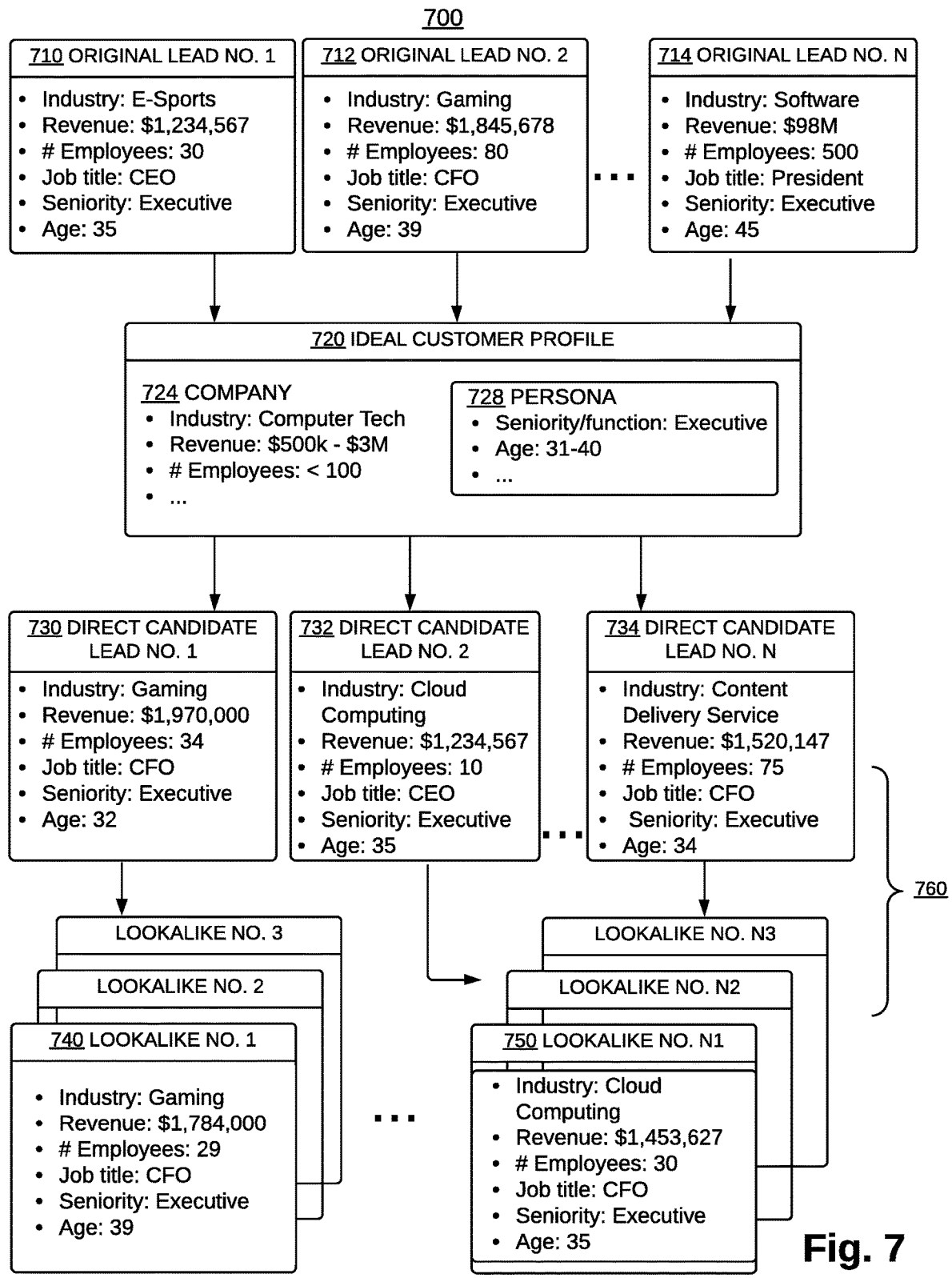
FIG. 7 is an illustrative example showing the generation of ICP, direct candidate leads, and lookalikes in one embodiment of the present invention.

"Ideal Customer Profile" (ICP) is a lead profile or customer profile defining, describing, quantifying, or personifying core, ideal customers that drive the most revenue. An ICP may be used to benchmark existing leads, or as template for generating new leads. An ICP may contain two aspects, company and persona, where each may be specified by one or more attribute or property fields. A company profile characterizes a client organization of interest. A persona profile characterizes the client in terms of one or more roles within the client organization for targeted marketing campaigns. An ICP may comprise attributes correlated with high probability of successfully closing and winning high-value deals, in terms of metrics, scores or weightings as defined or disclosed herein. An ICP is a "template" for ideal customers, based on various parameters that are described by attribute fields. Some examples of attribute fields describing ICPs are illustrated in FIG. 7. For example, the attribute fields of "seniority=Executive" and "age <=35" in an ICP would indicate that the persona of an ideal customer is an executive-level individual with an age of less than or equal to 35. These attribute fields are used to match potential leads to the ICP, based on a match rate signal.

"Lookalike" is a candidate lead obtained through comparing and matching attributes of leads from various data sources to the profile of one or more direct candidate leads. Lookalikes of lookalikes may be similarly generated, so that there may be a hierarchy of lookalike candidate leads at different levels. Direct candidate leads and lookalikes at different levels may both be targeted by marketing campaigns in the same way.

"Match rate" or "Match rate signal" is a score or measure of the similarity of a lead to a given profile such as an ICP. Leads with high match rates may be considered as "matching" the ICP. In one example, a match rate may be computed as a percentage of the number of attributes in a lead that matches those for a given ICP; in another example, a match rate may be computed as a weighted combination of degrees of similarities between lead attributes and ICP attributes. Other examples of match-rate signals include percentage of attributes of a customer lead meeting the attribute fields of the ICP, number of attributes of a customer lead meeting the attribute fields of the ICP, a weighted average of attributes of a customer lead meeting the attribute fields of the ICP, and so on. "Demand generation" refers to the generation of high quality leads that match one or more ICPs, and respond to targeted advertising campaigns.

"Test target group", "target set", "test lead group," or "targeting set" is a subset of candidate leads selected based on certain criteria for marketing campaigns direction and targeting.

"Cost per lead" (CPL) is an advertising channel partner cost of an acquisition of a new acquired, opt-in, or qualified lead. A CPL is an expense that a user of the METADATA system bears for reaching the lead through paid media, such as channel advertising partners.

"Experiment" refers to any targeted advertising campaign, completed in the past, currently running, or designed for the future. An experiment provides insights into the effectiveness of particular campaign setting or configurations on a set of candidate leads. For example, an experiment may be a micro-campaign for validating one or more experiment parameters, and a main campaign may comprise one or more experiments selected from a candidate set of experiments.

Overview

With reference to the definitions above and the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention relate to methods and systems for demand generation, where high-quality opt-in business leads are identified using audience customization, targeted advertising campaigns, and lead profile optimization based on target audience feedback. Generally, Business-to-Business (B2B) companies face the challenge of generating a predictable volume of high-quality leads per unit cost spent in paid advertising. Embodiment of the present invention increases the likelihood of generating low-cost, high-quality leads by providing a closed-loop process that starts from Ideal Customer Profiles (ICPs) and ends in form conversions. The generated opt-in business leads may be sent to a Customer Relationship Management (CRM) or marketing automation system, to be followed up by a sales team. Such opt-in leads are associated with higher marketing-to-sales conversion ratios.

More specifically, the METADATA system first finds and enriches candidate leads that match a set of attribute criteria specified by one or more ideal customer profiles (ICPs), which characterize an ideal person within a potential client organization for targeted advertising campaigns. The METADATA system then utilizes a multivariate testing process to generate and evaluate test campaigns with different combinations of campaign parameters such as campaign costs and campaign landing pages. Each test campaign may be associated with a campaign budget or cost, to be paid to channel advertising partners for executing the campaign over third-party platforms. Each test campaign is directed to a group of associated test candidate leads. Once test campaigns are in action, the METADATA system may automatically feed click-throughs from the advertising or landing pages as acquired customer leads back into the system, and may, in some embodiments, further feed transaction activities by the acquired leads from the CRM back into the system. Such feedback information and other direct and/or indirect responses to the test campaigns indicate a level of interest and a likelihood to closing by the acquired leads. METADATA may then perform filtering and statistical analysis to ensure the quality of the acquired leads, to differentiate or stratify such leads into various levels of quality based on one or more scoring criteria and to update and optimize the ICP to capture and customize more relevant candidate leads for targeted advertising. METADATA may also score test campaigns and sub-campaigns, using campaign scoring criteria such as voluntary opt-in rates, lead qualities, cost per lead (CPL), generated opportunity amount, and other analogous metrics. The best-performing test campaigns may be targeted to larger subsets of the candidate leads, to generate additional opt-in leads, to interactively improve the quality of the ICP, and the test campaigns, all for further marketing and sales automation down the sale funnel.

In contrast to conventional and current existing sales automation systems and technologies, METADATA closes the marketing loop by targeting tailored advertising campaigns to a custom audience, and converting candidate leads into acquired leads. METADATA also utilizes multivariate testing of individual test campaigns and statistical analysis of campaign responses to optimize the ICP, individual campaigns, and the composition of target lead groups. METADATA is therefore capable of iteratively refining respective characteristics of ICPs, target lead groups, and campaigns, with quantitative fine-tuning of granular criteria. Moreover, METADATA allows users to manually adjust the parameters and revise the results of the automatic processes as disclosed herein. In this way, audience customization and targeting may be achieved on a large scale with very high accuracy and low cost, as testing on small subsets of candidate leads reduces unnecessary delay and extra costs to channel advertising partners. A key advantage of the META- DATA system through its closed-loop architecture is its ability to produce high-quality, opt-in leads which a sales team can better focus on nurturing, instead of outputting a large number of contacts indiscriminate of their sales potential. Additionally, the ability to narrow down the targeting to a discrete list of companies and prospects that perfectly match the ICP and resemble historical customers, together with a 'pull vs push' (i.e. inbound vs outbound), guarantees a scalable process and provides pipeline predictability in terms of quality and quantity.

System Architecture

FIG. 1 is an illustrative schematic diagram 100 showing a business lead generation framework, according to one embodiment of the present invention. Bi-directional data flows are shown here between a Customer Relationship Management (CRM) system 102, a system user 105, META-DATA system 110, third-party systems including one or more databases 130, leads 140, and one or more advertising partners 160, In some embodiments, METADATA system 110 may receive the system user's CRM data from CRM system 102. Such CRM data may comprise lead profiles, Ideal Customer Profiles (ICPs), and/or accounts, opportunities, contacts, and leads. Alternatively, METADATA system 110 may receive CRM data from system user 105 directly, or from an internal METADATA database, not shown explicitly here.

Generally, a lead, contact, or prospect is a prospective consumer of a product or service, and a potential or an actual existing customer of a user of METADATA. An existing customer whom the user has previously served may be suitable for new products or services currently being marketed, thus may be potential leads and prospects for targeted marketing campaigns. A lead, contact, or prospect may refer to individuals, but may also refer to the company or business an individual belongs to. In FIG. 1, leads 140 refer to actual companies, individuals, or end user devices operated by individuals, from whom advertising campaign feedback data such as click-throughs may be collected.

A user or system user such as 105 refers to an end user or customer of METADATA. A user may be a person, a device, a company or business that the person or device belongs to, or a sales or marketing team within the company or business. A company or business is an organization or entity where goods and services are exchanged for one another, for money, or for achieving other objectives. A business client, client, or business customer, is a customer of a user of METADATA. In the present disclosure, a business client, client, business customer, or customer may refer to either a company or business, or the persons within A lead profile or customer profile may comprise attribute fields to describe a business client or a set of business clients to system user 105. An ICP is a lead or customer profile defining, describing, quantifying, or personifying core ideal customers that may drive the most revenue to system user 105. The ICP may comprise attributes correlated with high probabilities of successfully closing and winning high-value deals, in terms of metrics, scores or weightings as defined or disclosed herein. The ICP may be used to benchmark existing leads, or as template for generating new leads. The ICP may contain two aspects, company and persona, where each may be specified by one or more attribute fields. A company profile specified by company attribute fields characterizes a client organization of interest. A persona profile specified by persona attribute fields characterizes the client in terms of one or more roles within the client organization for targeted marketing campaigns. Exemplary company attributes include, but are not limited to, industry, company name, revenue, number of employees, brands, and growth. Exemplary persona attributes include personal name, age, gender, title, seniority, education level, and the like.

In some embodiments, a persona or client persona specifies a role or decision-making category held by one or more individuals within a company or business. Such personas include, but are not limited to, CEO, CTO, CFO, Manager, Director, Economic Decision Maker (EDM), Technical Decision Maker (TDM), and Business Decision Maker (BDM). Such roles are generally well understood and may be defined by demographic signals such as job title, seniority, professional group, skillset, education and other demographic, technographic or buyer intent signals. Those roles usually have defined responsibilities with respect to the given business, and may be reached out to by METADATA for targeted marketing or advertising campaigns. In some cases, a B2B customer may have complex internal purchasing agents as personas. Such internal purchasing agents include, but are not limited to, CEO, CTO, CFO, marketing manager, sales director, director of product, project manager, program manager, programmer, analyst, database administrator, designer, chief architect, and software engineers. A persona describes, and may be specified by, the attributes of an individual. However, a persona is not necessarily equivalent to an individual in the context of targeted marketing campaigns, which are tailored for specific roles within different companies. In one example, a company may have only one employee, who serves as the CEO, CTO, and CFO concurrently. In this case, there are three personas, but just one individual employee who holds all three titles.

Given an ICP retrieved from CRM 102, system user 105, or internal METADATA storage, METADATA system 110 may generate multiple candidate leads for targeted advertising campaigns by using one or more attribute fields of the ICP as search keys into one or more lead data sources. A lead data source may be a METADATA system database, a user database, a third-party database, or a channel advertising partner such as 160. In FIG. 1, third-party databases or third-party partners 130 may comprise one or more lead data sources, and one or more enrichment data sources. Both lead data sources and enrichment data sources may provide software as a service, offering business information, contact data, social media data, and customer CRM data.

Enrichment data sources may provide to METADATA system 110 additional lead attribute information as enrichment data to enrich the candidate leads. Depending on data availability, the enrichment process may yield zero, one, or multiple enrichment attributes for each candidate lead. In some embodiments, the enrichment data may include new attribute fields, or attribute values for existing attribute fields. In some embodiments, primary keys may be obtained for the candidate leads, and secondary keys may be obtained using the primary keys as keys into the enrichment data sources, where the secondary keys now serve as primary keys for the enrichment data sources. The enrichment of each candidate lead may comprise populating one or more attribute fields of the candidate lead with attribute values retrieved from the enrichment data sources using the secondary keys.

In some embodiments, candidate leads as obtained or generated above, by directly comparing lead attributes to a given ICP, may be called "direct candidate leads." In some embodiments, the candidate lead generation process may further include one or more steps to obtain lookalike leads and lookalikes of lookalikes. Direct candidate leads and lookalike leads constitute a customized audience of candidate leads for targeted advertising campaigns. In some embodiments, the ICP may be iteratively updated or optimized based on feedbacks from targeted candidate leads, and the customized audience may be refined or supplemented with additional candidate leads generated based on the updated ICP.

In some embodiments, system user 105 may provide configurable campaign parameters such as campaign budgets, and campaign offers including landing pages for testing and comparison through the METADATA system. For example, multivariate testing may be performed. Multivariate or multi-variable testing is a technique for testing a hypothesis on multiple variable systems. The goal of multivariate testing is to determine which combinations of the variables perform the best out of all possible combinations. In the context of campaign testing, system user 105 may specify intended advertising channels, define particular parameters for marketing campaigns, and provide campaign budgets, creatives, and assets such as white papers, e-books, webinars, or other informative and/or incentive information, to be amplified through the advertising process. Such assets may be amplified through third-party advertising partners 160, via METADATA system 110, For each combination of campaign parameters such as test campaign budget, landing pages, and customized test leads, METADATA system 110 may send automatically generated campaign landing pages to third-party advertising partners 160, which in turn serve these pages to a group of test target leads 140. A test target group, target set, test lead group, or test set is a subset of candidate leads selected based on certain criteria for marketing campaign targeting. Third-party channel advertising partners such as 160 may provide advertising platforms through which targeted campaigns may be run.

In various embodiments of the invention, a candidate lead may indicate various levels of interest by providing feedback through one or more channels. Responses from candidate leads may also be called feedback, and may be collected through any new or conventional channels such as landing pages, social networks, emails, mailing list signups, webpage cookies, or phone calls. For example, a lead may click on the campaign page, thereby directly submitting feedback to third-party advertising partners 160, which may route such feedback information into system 110. A candidate lead may also respond to the campaign indirectly. An example is when a candidate lead does not click on the landing page, but orders a product or service provided by system user 105 directly in a new browser window. In this case, system user 105 may provide the order information to METADATA 110 directly, or indirectly through CRM system 102. In another example, a client may not click on a landing page, but may physically leave his or her office, drive to the airport, and while on the airplane, use in-plane Wi-Fi to buy the product upon remembering the advertisement seen earlier. This sale may be recorded by system user 105 in CRM system 102 as one or more lead attributes, such as the amount of this deal, its status of being closed and won, and the time at which it went through. These lead attributes may then be fed back into METADATA system 110 by CRM 102. Yet another situation of indirect response to a campaign is that an existing client of the system user, upon seeing the campaign page, does not click on it, but instead contacts a salesperson of the system user's organization directly to conduct business for a new transaction. Such a transaction would again be recorded in CRM 102, and lead attributes updated with the time, amount and status of the transaction. These client responses and lead attributes may be fed back into system 110 by CRM 102.

After test campaigns are deployed, METADATA system 110 may analyze collected campaign results to evaluate the effectiveness of each test campaign. Furthermore, user 105 may input into system 110 notes on an individual or a group of leads, based on observations of the campaign results. In some embodiments, lead scores and/or campaign scores may be computed based on candidate lead attributes and candidate lead feedbacks.

A lead score is a numerical value that may quantify the quality of a lead, and may be used to differentiate or stratify leads into various levels of quality based on one or more scoring criteria. In some embodiments, the lead score may be independent of test campaigns to which the lead has been targeted to; in some embodiments, the lead score may additionally indicate a level of interest or responsiveness by the lead to a test campaign, and to the B2B user's products and services. To compute a lead score, one or more lead score criteria may be converted to numerical values, normalized, and combined in a nonlinear or linear function, such as a weighted average, to compute a single lead score for each lead. Lead scores criteria may include, but are not limited to, match rate to an ICP, match rate to a targeted account, voluntary opt-in weight, campaign cost, previous or expected booking amount, time to booking, opportunity, opportunity amount of closed opportunities, opportunity chance, user manual feedback, and combinations thereof. As an illustration, assume lead scores are computed and normalized to have values between 0 and 1, where 0 indicates a lowest quality, and 1 indicates a highest quality lead. In one example, a lead score may be assigned the binary value of 1 if the lead has voluntary opted-in to a test campaign, and 0 otherwise. In another example, a lead score may be computed by averaging a match rate signal to an ICP, and a voluntary opt-in weight for a given test campaign. That is, if the lead has matched to 80% of the ICP's attributes, yet has not opted-in for the test campaign, a lead score may be computed as $$\frac{1}{2}(0.8 + 0) = 0.4,$$

indicating that the lead has good potential to respond, but did not respond to this particular test campaign. These formulas described herein are exemplary only, as one of ordinary skill in the art would recognize multiple nonlinear or linear formulas are within the scope of the invention, and the formulas shown here are not intended to be limiting the scope of the invention.

Similarly, numerical campaign scores may be computed based on one or more campaign score criteria or components, to evaluate the strength of a campaign, and to quantify the effectiveness of the campaign in acquiring leads. In some embodiments, each campaign score component may be configurable. Exemplary components include, but are not limited to, number of impressions, impression rate or percentage, number of clicks, click rate or percentage, match percentage and/or match rate of leads to the ICP, match percentage and/or match rate to a targeted account, visit-to-form-submission conversion percentage, campaign budget or cost, cost per lead (CPL), match rate signal, candidate lead voluntary opt-in weight, previous or expected booking amount, time to booking, opportunity, opportunity amount of closed opportunities, opportunity chance, user manual feedback, and lead scores computed by METADATA or provided by the CRM. CPL may be an advertising channel partner cost of an acquisition of a new acquired, opt-in, or qualified lead. A CPL may be an expense that a user of the METADATA system bears for reaching the lead through paid media, such as the advertising channel partner. Any number of such components may be converted to numerical values, normalized, and combined in a nonlinear or linear function, such as a weighted average, to compute a single campaign score for each campaign. As an illustration, assume campaign scores are computed and normalized to have values between −1 and 1, with better campaigns having higher positive scores. In one example, a campaign score may be computed as the visit-to-form-submission conversion percentage, and a test campaign with a 50% visit-to-form-submission ratio may be assigned a score of 0.5. In another example, a test campaign score may be computed as a weighted average of mean voluntary opt-in weight, mean match rate of test leads to the ICP, and a normalized CPL offset. That is, if a test campaign has been targeted to two leads at a CPL of $2 when a maximum CPL threshold is $10, with each lead matching 60% and 80% of the ICP's attributes, and where each lead opted-in for the test campaign, a campaign score may be computed as $$\frac{1}{3}\left[\frac{1}{2}(0.6+0.8)+\frac{1}{2}(1+1)-\frac{\$2}{\$10}\right]=0.5.$$

On the other hand, if for a similar test campaign targeted at the two same leads, the CPL is $10, and only one lead opted-in, the campaign score may be computed as $$\frac{1}{3}\left[\frac{1}{2}(0.6+0.8)+\frac{1}{2}(0+1)-\frac{\$10}{\$10}\right]=0.07.$$

Clearly, the first campaign score indicates that the first test campaign has better quality, as more ideal leads have opted in, while the CPL is low. In these examples, CPL is calculated as the overall campaign cost divided by the total number of leads. In some embodiments, CPL may refer to cost per acquired lead instead, and the formulation of campaign scores may be adjusted to take into account such differences in the terminologies. These formulas described herein are exemplary only, as one of ordinary skill in the art would recognize multiple nonlinear or linear formulas are within the scope of the invention, and the formulas shown here are not intended to be limiting the scope of the invention.

Based on computed campaign scores, METADATA system 110 may eliminate test campaigns that have performed poorly, for example, with scores below a given threshold, and may further promote high-score test campaigns by deploying them again to larger groups of target candidate leads. A main targeted advertising campaign may therefore be deployed in larger scale, where the main campaign comprises one or more micro-campaigns that were replicated from the high-performing test campaigns. In addition, candidate leads that respond affirmatively to test campaigned may be studied, and its attribute values used to compute attribute scores, for further updates to the ICP. With such campaign feedbacks, both target audience and target campaigns may be iteratively optimized, to drive down the cost per high-quality lead, and to improve the likelihood of identified opt-in business leads participating in purchase actions in later stages of the sales funnel.

Figure 2:
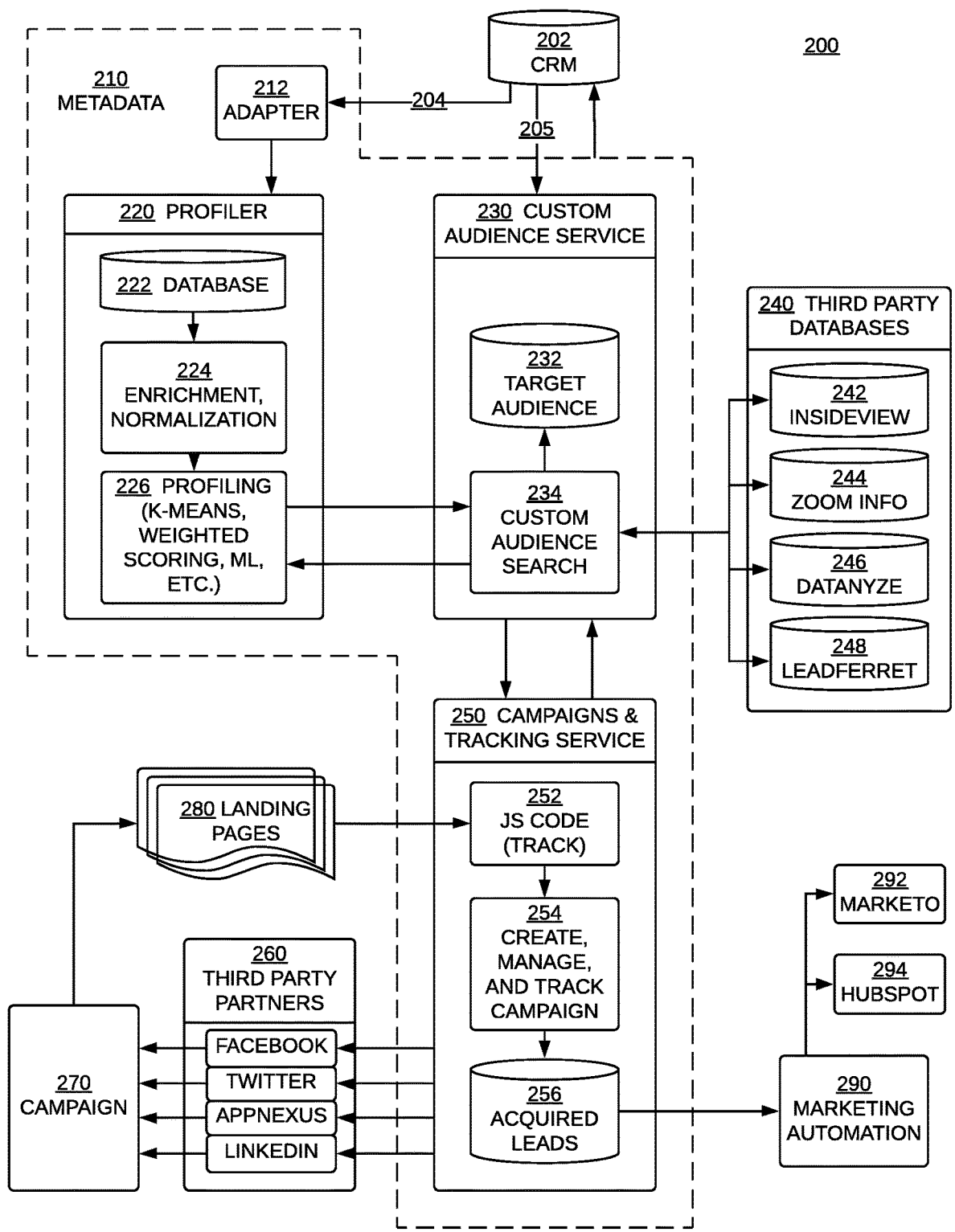
FIG. 2 is an illustrate software architecture diagram for business lead generation, according to one embodiment of the present invention.

FIG. 2 is an illustrative software architecture diagram 200 for opt-in business lead generation, according to one embodiment of the present invention. Here METADATA system 210 is divided into four modules: adapter 212, profiler 220, custom audience service module or leads engine 230, and campaigns and tracking service module or campaigns engine 250.

In some embodiments, adapter and profiler 220 may be optional, and an ICP may be retrieved directly as part of CRM data 205 from CRM system 202 by custom audience service module 230. A custom audience search sub-module 234 may use the ICP to find candidate leads. For example, the ICP criteria may be pushed into a search engine, connected to one or more third-party data sources 240, to locate potential leads from potential companies that fit the ICP, and to enrich the candidate leads using enrichment data retrieved from enrichment data sources. Exemplary third-party databases that may serve as lead data sources and enrichment data sources include, but are not limited to, Insideview 242, Zoom Info 244, Datanyze 246, and Leadferret 248. Some third-party databases are provided by third-party advertising partners. For example, advertising platforms such as Facebook, Twitter, and LinkedIn may be used to find and enrich candidate leads as well. Candidate lead thus generated may be stored locally in a target audience database 232. In some embodiments, custom audience search sub-module 234 within METADATA system 210 may dictate which third-party database(s) to use as the lead data source, and which to use as enrichment data source. In some embodiments, a system user (not shown in FIG. 2) may dictate which third-party database(s) to use as the lead data source, and which to use as the enrichment data source.

A lead may be considered "matching" a given ICP or satisfying the ICP criteria if its attribute fields match that of an ICP with a high match rate or a high probability. A match rate or match rate signal may be a score or measure of the similarity of a lead to a given lead profile such as an ICP. In one example, a match rate may be computed as a percentage of the number of attributes in a lead that matches a given ICP. In another example, a match rate may be computed as a percentage of ICP attributes that the lead has matched to. For instance, assume an ICP has 10 attribute fields. A lead that matches to 80% of the ICP criteria or 8 of the attribute fields may be assigned a match rate of 0.8. A match rate may also be computed as a weighted combination of degrees of similarities between lead attributes and ICP attributes. For example, some ICP attribute fields such as "annual revenue" may weight more than other ICP attribute fields such as "number of employees." For an ICP with 10 attribute fields, annual revenue may be assigned a weight of 2, while other fields may be assigned a weight of 1 each. Thus, a lead that matches to 8 of the ICP criteria, including the annual revenue, may be assigned a match rate of 9/11, or 0.818.

In some embodiments, adapter 212 and profiler 220 may be used to explicitly generate an ICP, to be used by custom audience service module 230. For example, a system user's CRM data 204 including accounts or companies, opportunities, contacts, and leads, may be downloaded from CRM system 202 as qualified leads, via a download file or salesforce integration. In some embodiments, such CRM data 204 may be processed by adaptor 212 for compatibility with METADATA's local storage formats. In some embodiments, adapter 212 may normalize attribute values of retrieved qualified leads to desired ranges. An attribute field may take on numerical, textual, or alphanumerical values, may have a not-applicable (n/a) value, or maybe blank to indicate that the attribute value is missing. Each qualified lead may have at least one attribute field having an attribute value satisfying a qualification condition. For example, the qualified leads may be past clients of the system user, or may have previously expressed interest in the system user's service or products. The retrieved qualified leads may be stored in METADATA's internal database 222.

In some embodiments, retrieved qualified leads locally stored in database 222 may be enriched by an enrichment and normalization sub-module 224, through an enrichment process similar to that discussed with reference to FIG. 1. Although not shown explicitly in FIG. 2, Profiler 220 may interact or connect directly or indirectly with third-party databases 240 to enrich the qualified leads. Again, normalization of individual attribute values may be performed when lead attribute data are retrieved from multiple data sources, and/or when necessary for the profiling process conducted by a profiling sub-module 226.

Profiling sub-module 226 may analyze enriched qualified leads to find most prominent deals, and determine a list of company and contact criteria that make up an Ideal Customer Profile (ICP), or a profile for a target audience. Statistical modeling, analysis and cluster analysis algorithms from machine learning may be used to determine the ICP. An exemplary but non-limiting ICP generation process utilizing the K-MEANS analysis is discussed in detail in the subsection entitled "Generation of a Lead Profile" later. A simpler exemplary histogram-based ICP generation processes is described with reference to FIG. 8. The generated ICP may be transmitted to custom audience search module 234 for determining candidate leads. In some embodiments, an ICP may be generated from a plurality of qualified leads; in some embodiments, an ICP may be generated from a single qualified lead, which may be viewed as a targeted contact. In some embodiments, an artificial intelligence (AI) operator may be implemented, as part of or in connection with profiling sub-module 226 to automatically generate, without user input, ICP attribute fields based on an analysis of high-conversion customers from historical data.

Once the ICP is retrieved or generated, candidate leads may be created by comparing or matching available lead data to the ICP. In some embodiments, the number of direct candidate leads found by comparing to the ICP directly may be limited. One possible solution is to upload the direct candidate leads to third-party databases or third-party partners to obtain lookalike leads. Another possible solution is to update the ICP via profiler 220, by analyzing the enriched direct candidate leads, and finding additional candidate leads that match the updated ICP. Viewed another way, a lead profile may be generated by profiler 220 from the enriched direct candidate leads, and used subsequently to find lookalikes to supplement the candidate lead pool. A lookalike is a candidate lead obtained through comparing and matching attributes of leads from various data sources to the profile of one or more direct candidate leads. Lookalikes of lookalikes may be similarly generated and enriched, so that there may be a hierarchy of lookalike candidate leads at different levels. Enriched direct candidate leads and lookalikes at different levels may both be targeted by marketing campaigns in the same way. Solutions in the prior art generate lookalikes based on internal channel information. Embodiments of the present invention, in contrast, since it connects to many other data sources, may use a much larger number of attributes to generate lookalikes. Moreover, rather than just having channel partners generate lookalikes, the system may itself generate lookalikes, before conducting AB testing, or other kinds of testings, between the target sets generated internally versus those generated by the channel partners.

As an illustrative example, the system may count how many lookalike candidate leads having, for instance, a match rate over 0.8 or a probability chance of closing future deals of over 70%, have been generated, and repeat the process to obtain more leads, if necessary, until a satisfactory amount has been generated to support the goals of a campaign. For example, if 1,000 conversions are required on a 10% visit-to-form-submission, then approximately 10,000 lookalike prospects are required. The quality of each candidate lead, no matter direct or lookalike, with respect to the mean, may also be evaluated.

If not enough leads are generated with the specified level of a metric, such as match rate or probability chance, the user may choose to lower the required level of such metric to increase volume, or simply target more lookalikes by generating higher-level lookalikes iteratively. For example, the METADATA system may upload 1,000 best contacts of candidate leads to Facebook, and generate a two million lookalike audience based on these best contacts. In this way, from 1,000 best existing matches to the ICP, two million addition Facebook "lookalikes" are added to the existing direct candidate leads previously obtained from the ICP. This lookalike generation process may alternatively be done in the METADATA system internally, through other media channel partners, or even within the clients' own lookalike generation system, if available.

Once a custom audience comprising multiple candidate leads have been generated, these candidate leads may be sent to campaigns and tracking service module 250, where dozens, hundreds, thousands, or even millions, of test advertising campaigns may be created by a create, manage, and track campaign sub-module 254, possibly under a multivariate testing framework as discussed with reference to FIG. 1. Each test campaign may be allocated, assigned, or associated with a campaign budget or cost, campaign assets, and designated landing pages. Each test campaign may target a different test target set, for example, a subset of the direct leads, lookalikes generated internally, lookalikes generated by channel partners, lookalikes of lookalikes, or a subset based on other micro-criteria. Each test target set may comprise any number of candidate leads, where the number of leads may depend on the allocated budget, desired campaign length, and other campaign parameters. For example, in the earlier case where 2 million lookalike leads were generated, assume a single campaign asset is to be distributed through 3 different landing pages via two different advertising partners of equal cost, and a total campaign budget is available for advertising to 6000 leads. Six test campaigns may be created, each having a different landing page, a different advertising partner, and a target group having 1000 leads. For instance, one test campaign may include Facebook, a Custom Audience A, and a landing Page B. In some embodiments, different test target sets may have non-empty intersections. That is, a candidate lead may be present in more than one test groups, each associated with different campaigns. In some embodiments, test leads may be randomly chosen from the pool of candidate leads and randomly assigned to different test groups. In other embodiments, test leads may be assigned based on lead profiles, lead attributes, or lead scores. For example, a set of CTOs and technical managers may be targeted by a technical campaign. In another example, a set of candidate leads having lead scores above a threshold (such as 0.7) may be chosen from the lead pool and targeted by a test campaign with a high budget or higher CPL, while another set of candidate leads having lead scores between 0.2 and 0.7 may be chosen from the lead pool and targeted by a test campaign with a lower budget or lower CPL.

In generating a test advertising campaign, the METADATA system may prompt a system user to choose among landing pages to determine where to redirect new clicks for this campaign. The system may also connect to marketing automation to pull current-running campaigns, and match the retrieved campaigns by type to appropriate persona profiles to be targeted, for example, technical campaigns for CTOs and financial campaigns for CFOs. The system may install code snippets on both the landing page and an associated 'thank you' page, using means including but not limited to the following: enrichment JavaScript, UTM and other tracking codes, advertising channels' conversion tracking, and retargeting pixel. The system may estimate a visit-to-form-submission conversion percentage, or prompt the user to set a value for it. The system may also prompt the user for a total budget, such as $1,500, or a number-of-conversions goal, such as 300 webinar signups, for the campaign and a date spectrum, such as from Sep. 1, 2017 to Oct. 1, 2017. Other campaign parameter or criteria may be configured by the user in a similar fashion as well. In some embodiments, the AI operator may automatically generate at least one of the test advertising campaigns based on analysis of high-conversion test campaigns from historical performance. In some embodiments, the AI operator may deploy machine learning techniques to extract correlations between campaign parameters and one or more campaign performance metrics, based on historical data, to automatically generate, without user input, new experiments and new targeted advertising campaigns. An exemplary test advertising campaign generation process is discussed with reference to FIGS. 12 and 13.

The system may at this point deploy the test marketing campaigns at different levels of hierarchy across multiple channels against the target audiences. For example, generated test campaigns may be uploaded with its target test lead group to different advertising networks or third-party partners 260 based on hashed keys, such as email, Twitter handle, Facebook handle, IP address, and cookie, to hyper-target that audience across these networks. Exemplary third-party partners include, but are not limited to, Facebook, Twitter, AppNexus, and LinkedIn. The system may direct campaign 270 to associated landing pages 280, and monitor feedbacks from the target audience, to track performances of the test campaign via tracker 252, which may be implemented using JavaScript. In different scenarios, a targeted candidate lead may be converted within the advertising platform, in one of the landing pages, or through other channels, according to the type of the campaign. Converted, opt-in, or acquired leads may be stored in acquired leads database 256, and may be automatically enriched with additional data retrieved from third-party databases. The acquired leads may also be pushed into the system user's marketing automation system 290, for example, Marketo 292 and Hubspot 294.

In some embodiments, module 250 may prompt the system user (not shown) to provide feedback information on the target audience for each campaign, through generic or customized interfaces such as email or a Campaign Leads page. The system user may see which candidate leads were attracted by each campaign, possibly in the form of an opt-in list that lists all target candidate leads who have responded affirmatively to one or more of the associated landing pages 280. In some embodiments, statistical data on the campaign's performance may be collected by third-party partners or the METADATA system, and optionally displayed to the system user, for manual editing and revision to campaign parameters to optimize campaign performances.

To evaluate the performance or effectiveness of each test campaign, collected campaign results may be statistically analyzed against certain metrics. As a result, campaign budget may be increased or experiments may be eliminated. For example, a visit-to-form-submission conversion rate may be used as the only criteria for campaign success. In the earlier case where 1000 leads are targeted by each of six different test campaigns, the conversion or opt-in rate for each test campaign may be viewed as a campaign score and ranked, and the test campaign with the highest score may be further deployed to all of the two million candidate leads who are reachable via the advertising platform used in the best-performing test campaign.

In some embodiments, opt-in or acquired leads may be cross-examined with new CRM data. For example, acquired leads may be served to the user's CRM system, and CRM data on the acquired leads may be subsequently retrieved or downloaded, after a time delay that may span days or weeks. A test campaign score computed for each test campaign may be further based on this subsequently retrieved CRM data. More specifically, the user's CRM may provide information on whether an acquired lead is closed or not, and details about bookings such as booking amount, time to booking, opportunity before booking happens, opportunity amount, opportunity chance or the probability that the opportunity will be closed and won, and lead scores provided by marketing automation software. In addition, a salesperson from the user's organization may provide manual feedback on leads and mark whether they are qualified for certain conditions. For instance, the system may score a given test campaign based on CRM data of Salesforce opportunity.created=true and Salesforce opportunity.amount=$10,000.

In some embodiments, the METADATA system may define a candidate-lead voluntary opt-in weight as a numerical value between 0 and 1, representing a level of interest according to feedback information by a candidate lead to a test campaign. This candidate-lead voluntary opt-in weight may be defined as non-zero for an opt-in or acquired candidate lead, where a candidate lead "opts-in" or is "acquired" when he or she clicks on a landing page, or otherwise responds to a campaign positively within some specified time frame as specified by the CRM data. Instead of being discrete and binary, this weight may be continuous, and may depend on the level of interest indicated in the feedback provided, updated attributes of opportunity amount and status, such as closed and won, time to positive feedback received, salesperson input as referred to above, and other analogous metrics.

In some embodiments, the score of a given test campaign or campaign trial is based on a tuple of numerical values that may be weighted, for comparison with a single threshold or directly compared to multiple thresholds. The tuple may include, but is not limited to, the following elements: visit-to-form-submission conversion percentage, total budget, advertising cost per lead (CPL), match rate signal, candidate lead voluntary opt-in weight, booking amount, time to booking, opportunity before booking happens, opportunity amount, opportunity chance, and marketing automation software internal lead scoring. All factors discussed here may be weighted to form a single score for any particular campaign.

In some embodiments, the AI operator may track the performance of each test campaign automatically, continuously or at discrete intervals, to provide incremental feedback in terms of campaign parameter adjustments, for tuning currently running campaigns or for generating new improved campaigns. In some embodiments, performance of targeted advertising campaigns are tracked and one or more of the targeted advertising campaigns may be automatically repeated based on historical performance data, where more successful targeted advertising campaigns, as measured by one or more desired metrics, such as customer conversion rates, are repeated, and less successful advertising campaigns are discarded. New experiments or test advertising campaigns may be generated, and subsequently new targeted advertising campaigns may be generated.

Figure 3:
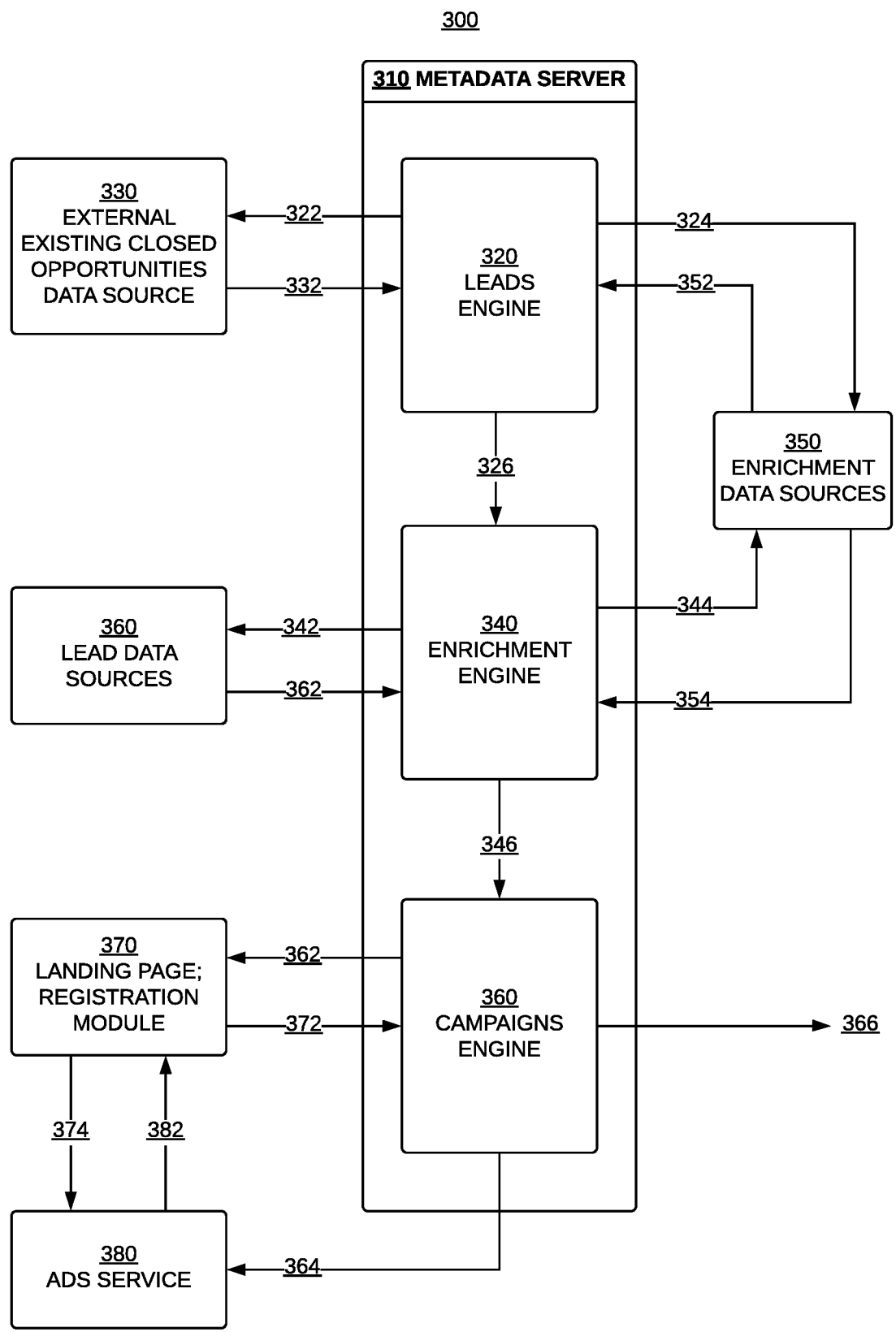
FIG. 3 is another illustrative software architecture diagram for business lead generation, according to one embodiment of the present invention.

FIG. 3 is another illustrative software architecture diagram 300 for opt-in business lead generation, according to one embodiment of the present invention. In this embodiment, a METADATA server 310 contains three main engines: a leads engine 320, an enrichment 340, and a campaigns engine 360.

To generate high-quality opt-in leads, first, leads engine 320 may send queries 322 to an external existing closed opportunities data source 330, for example, a CRM system such as Salesforce. An ICP may be retrieved as part of the CRM data 332. Alternatively, qualified leads may be retrieved. In some embodiments, using some means to identify leads as primary key, leads engine 320 may send a query 324 to an enrichment data sources 350, to obtain enrichment data 352 for enriching the qualified leads. Based on the qualified leads, leads engine 320 may determine one or more ICPs. Enriched leads and the one or more ICPs may be sent as data 326 to enrichment engine 340 for generating new candidate leads in addition to the qualified leads.

Enrichment engine 340 may send a query 342 to lead data sources 360 to fetch new leads 352 which match the one or more ICPs. These new leads are direct candidate leads, and may be further enriched with enrichment data 354 retrieved after queries 344 are sent to enrichment data sources 350 by enrichment engine 340. These enriched direct candidate leads may serve again as the input to enrichment engine 340 to generate yet more new candidate leads, or lookalikes, to be enriched again. This process may be repeated in any number of iterations to generate a hierarchy of lookalikes. All leads thus generated may be called candidate leads, and all enriched candidates leads may be sent to campaigns engine 360 as data 346.

In some embodiments, campaigns engine 360 uploads a campaign 364 with a set of enriched candidate leads as the target audience. In some other embodiments, campaigns engine 360 uploads enriched candidate leads only, and ads service provider 380 targets all or subsets of the candidate leads with existing campaigns. Campaigns engine 360 may also send campaign configurations 362 from the system user to a landing page or registration module 370, which could be internal, or an external one like Hubspot. Landing page or registration module 370 may upload landing pages 374 onto ads service provider 380, such as Facebook Ads or Google Ads, to be served to the targeted candidate leads. If targeted leads directly respond to the ads, submission of their information may be reported from ads service provider 380 to landing page or registration module 370, and reported from the landing page or registration module 370 through 372 back to campaigns engine 360 for internal analytics. METADATA server 310 may output campaign scores and lead scores 366, and generate acquired or opt-in leads by selecting from candidate leads who responded affirmatively to the targeted advertising campaigns.

Although only a single campaign 364 has been discussed so far, multiple test campaigns, micro-campaigns, sub-campaigns, or main targeting campaigns may be run by campaigns engine 360, in sequence, in parallel, or iteratively, to determine preferred campaign parameters from test campaigns, and to generate high-quality opt-in leads from large custom audiences derived from the ICP and possibly fine-tuned based on performances of the test campaigns.

Lead Profiles and Attributes

FIG. 4 is an illustrative record 400 showing exemplary attribute fields of lead, or a contact within a company, according to one embodiment of the present invention. Each row, such as row 420, represents an attribute field, where each attribute may be viewed as a variable having a variable name as specified by column 412, and a variable value as specified by column 414. In this example, attribute fields in the upper table 410 represent an original lead record as retrieved from a lead data source, while attribute fields in the bottom table 450 represent enrichment data as retrieved from one or more enrichment data sources. As discussed previously, lead attribute fields may be divided into company attributes and persona attributes. For example, Full Name, Job Title, Gender, and Education may be persona attribute fields specifying personal information about a contact within the company, while the company may be described by company attribute fields such as company, domain, industry, and number of employees. Similarly, enrichment data may constitute company or persona attribute fields. Attribute fields shown in record 400 are for illustrative purposes only, and are meant to be neither limiting nor exhaustive.

In this example, every single attribute has a specific alphanumeric attribute value. The "Persona Twitter" attribute field further comprises four sub-fields, including address, tweets count, followers count, and likes.

Figure 5:
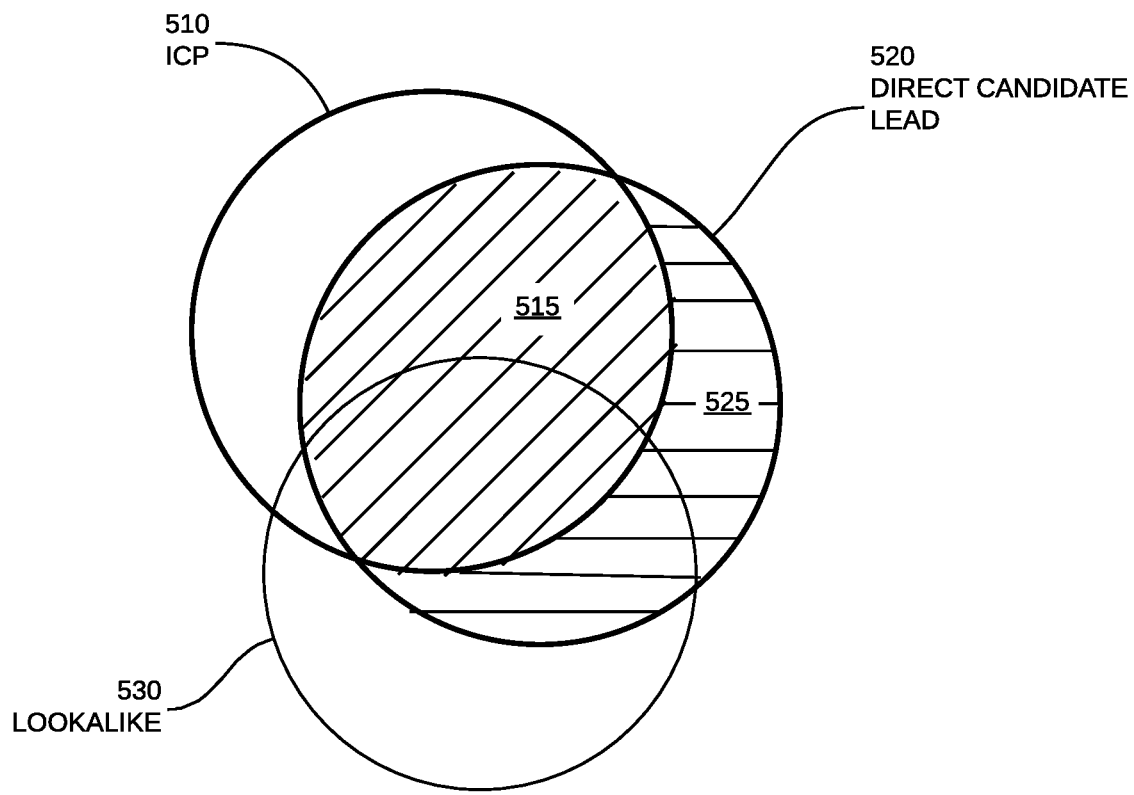
FIG. 5 is an illustrative profile attribute Venn diagram showing attributes of an Ideal Customer Profile (ICP), a direct candidate lead, and a lookalike, according to one embodiment of the present invention.

FIG. 5 shows a profile attribute Venn diagram 500 illustrating relationships between an ICP 510, a direct candidate lead 520, and a lookalike 530, where the lookalike is obtained based on the direct candidate lead or its profile. As discusses previously, ICP 510 is a customer profile of various attributes that characterize an ideal business customer. There may be one or more ICPs for any given advertising campaign. An ICP may be obtained by statistically analyzing and summarizing attributes of existing business leads. It provides quantitative and/or qualitative characterizations of an ideal business customer who is highly likely to positively respond to a marketing campaign.

Once an ICP is available, a direct candidate lead may be obtained by comparing or matching attributes of potential leads from various data sources directly to the ICP. A direct candidate lead often matches the ICP with a high match rate, as represented by the overlapping portion 515 in FIG. 5. In addition, portion 525 may represent direct candidate lead attributes that do not match those of the ICP 510. Such attributes may be original attributes, or attributes from an enrichment process. Similarly, a lookalike lead 530 may be obtained from one or more direct candidate leads by comparing or matching attributes of potential leads from various data sources to the profile of a direct candidate lead such as 520, or to the profile of a set of direct candidate leads. Again, a lookalike lead may have some original attributes as well as enrichment attributes obtained from other sources and added to the profile.

In some embodiments, a direct candidate lead 520 may be an opt-in lead. An opt-in lead is a lead that affirmatively or positively responds to marketing or advertising information directly or indirectly, as explained above. Responses from opt-in leads may also be called feedback, and may be collected through any new or conventional channels such as landing pages, social networks, emails, mailing list signups, webpage cookies, or phone calls. Similarly, a lookalike 530 based on one or more direct candidate leads may or may not opt-in to a marketing campaign. Furthermore, lookalikes of lookalikes may be generated from the lookalikes based on direct leads, and may or may not opt-in. Lookalikes of other various levels may be generated in similar fashions.

Figure 6:
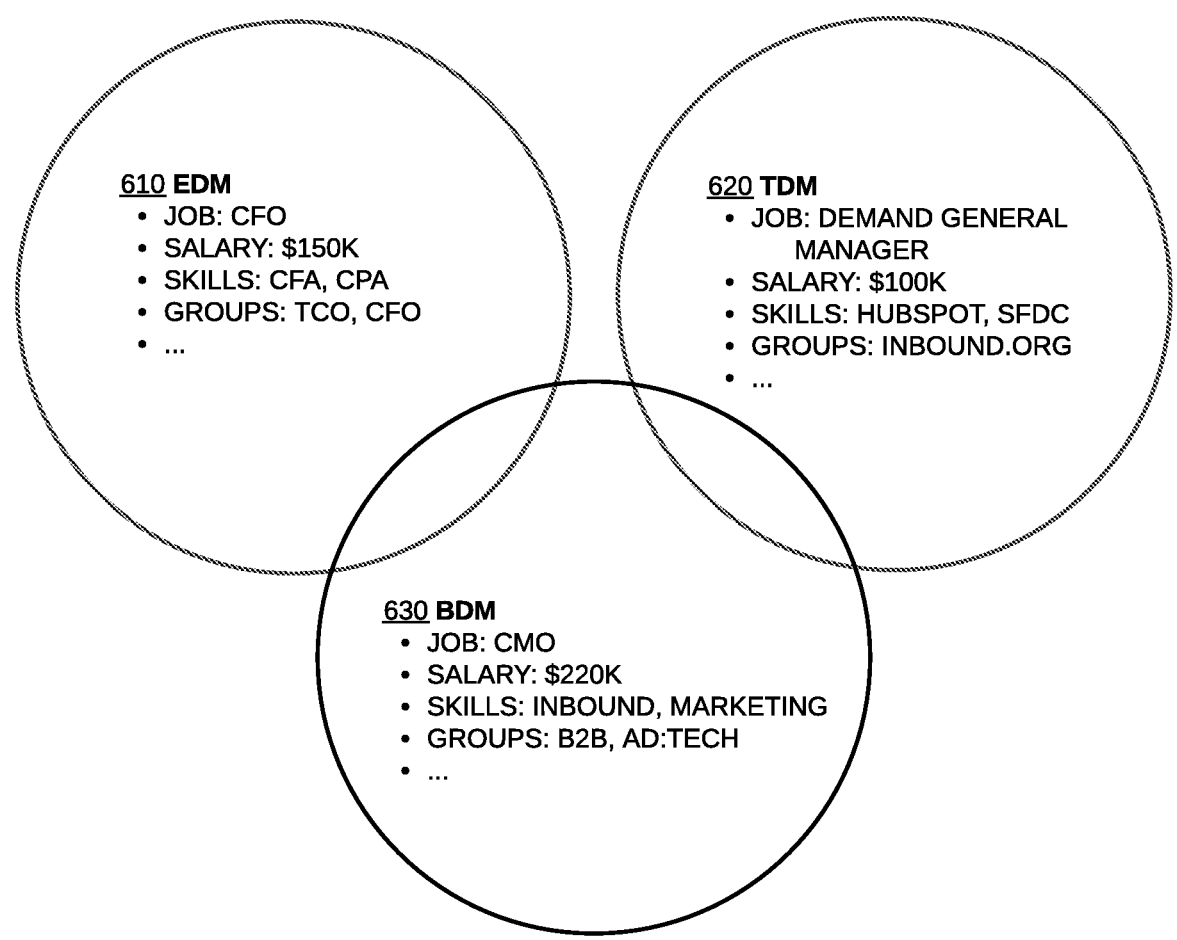
FIG. 6 is a diagram showing different personas involved in a buying decision, according to one embodiment of the present invention.

FIG. 6 is an diagram 600 illustrating how different personas involved in a buying decision may be represented and related, according to one embodiments of the present invention. Here, METADATA identifies three separate personas, each representing a different entity involved in buying decisions: an Economic Decision Maker (EDM) 610, a Technical Decision Maker (TDM) 620, and a Business Decision Maker (BDM) 630. Overlaps of the circles represent shared attributes between personas. Any buying decision may involve one, or two, or all personas. In this example, one buying decision may involve BDM 630 and EDM 610, and another buying decision may involve BDM 630 and TDM 620. In some embodiments, the METADATA system may ask the user to approve one or more personas in a vetting process illustrated as part of FIG. 8 below. In some embodiments, once a map of personas is built, the METADATA system may prompt the user to label each persona with a friendly name such as EDM or TDM for later use.

FIG. 7 is an illustrative diagram 700 showing the generation of an ICP, direct candidate leads, and lookalikes in one embodiment of the present invention. As discussed previously, once ICPs including personas are generated or identified, large samples of prospective customers may be collected for marketing campaign targeting. Such prospective customers or candidate leads may include direct candidates leads, and lookalikes at various levels. In the case where an ICP is readily available, candidate leads may be generated from the ICP directly.

To understand on a high level how ICP, direct candidate leads, and lookalikes are generated and related, FIG. 7 may be viewed as a schematic diagram 700 showing a candidate lead generation process, according to one embodiment of the present invention. In particular, FIG. 7 illustrates the generation of ICP 720 from original leads 710, 712, to 714, the generation of direct candidate leads 730, 732, to 734 from ICP 720, the generation of lookalikes 740 from direct candidate lead 730, and the generation of lookalikes 750 from direct candidate leads 732 and 734.

In some embodiments, a profiler 220 or a leads engine 320 may analyze attributes of original leads 710, 712, to 714, and generate an ICP 720 with a company profile 724 and persona profile 728. In this example, all original leads 710, 712 and 714 have roles in companies in the computer technology sector. Original lead 714 has a very large revenue that may become an outliner in the statistical analysis of the original leads, thus ICP 720 may be generated with a revenue attribute field in the range of $500 k-$3M. These attributes are shown in the company profile 724 of ICP 720. Similarly, original leads 710, 712, to 714 are in executive positions and are almost all between ages 31 and 40; such attributes show up in persona profile 728 of ICP 720. The profiler or leads engine thus generates ICP 720 with attributes shown in FIG. 7.

From ICP 720, custom audience service module 230 in FIG. 2 or leads engine 320 in FIG. 3 may retrieve direct candidate leads 730, 732 to 734 by matching for ICP attributes 720 from internal and third-party data sources, and may further retrieve lookalikes 740 to 750 by matching for attributes of the direct candidates leads 730, 732 to 734 in a similar way. Note that FIG. 7 shows only one level of lookalike generation, but this is in general an iterative process. Enrichment of direct candidate leads and lookalikes may be performed after each lead retrieval step.

In FIG. 7, candidate leads 760 may be selected by the METADATA system for targeted advertising campaigns, where candidate leads 760 include direct candidate leads 730, 732, to 734, and lookalikes 740 to 750. Some of these candidate leads 760 may have good match rate signals to the ICP and may opt-in. Moreover, in various other embodiments, multiple ICPs and personas may exist. The user may also specify different criteria of different levels of granularity.

Once ICPs and candidate leads are identified, the METADATA system may allow a user to start promoting a certain test marketing campaign to a test target group, which is a subset of candidate leads fulfilling certain criteria. For example, a test target group may have a target persona that resonates with that campaign content.

Lead Profile Generation

In this section, an exemplary process for generating a profile for a given set of leads is described. When the given set of leads are qualified leads associated with existing customers, the lead profile thus generated may be viewed as an Ideal Customer Profile (ICP). This example is meant to be illustrative only, and is set forth, without any loss of generality to and without imposing limitations upon, the present invention.

As described with reference to profiler 220 in FIG. 2, in some embodiments of the present invention, a lead profile may be generated from leads retrieved from CRM 202. Profiler 220 may first enrich the retrieved leads, then generate an attribute value score for each of a subset of the attribute fields of each enriched lead, compute a lead score for each enriched lead, based on the generated attribute value scores, and generate attribute fields for the ICP using the computed lead scores of individual leads as weights for corresponding attributed field values.

More specifically, given a set of leads, contacts, or records $R=\{r_1, r_2, r_3 \ldots\}$, each record $r \in R$ may have multiple attribute fields $A=\{a_1, a_2, a_3, \ldots\}$. A lead profile derived from the set of records R may have fewer than $|A|$ number of attributes fields. Those included in the lead profile may form a subset $P=\{p_1, p_2, \ldots, p_i \ldots\}$ of A, called property attribute fields. P may be a proper subset of A, or may equal to A. To determine the value of these property attributes for the lead profile, another subset $C=\{c_1, c_2, \ldots, c_j \ldots\}$ of A, called criterion attribute fields, may be chosen, and used in computing weight scores for weighting possible values of the property fields in generating the lead profile. C maybe be a proper subset of A, or may equal to A.

Scoring of Criterion Attribute Fields

As described with reference to the exemplary lead 400 shown in FIG. 4, each criterion attribute field may take on numerical or textual values, spanning over different value ranges. Thus, to score each individual criterion attribute field, the data type of each criterion attribute field may be taken into account. In some embodiments, a scoring function may be defined per type of field in C. In what follows, the score function of a record $r \in R$ in accordance to some criterion attribute field $c_j$ is denoted by $S_{c_j}(r)$.

For a criterion attribute field $c_j$ of type "ENUM," the enumeration mapping may be applied as a ranking, and divided by some factor to normalize the enumerated values to between 0 and 1, inclusive.

For fields of type "date" or "number," a variation of the known K-MEANS algorithm may be applied. In the K-MEANS algorithm, data points are partitioned into clusters, where each data point is assigned to the cluster with the nearest mean. In other words, searches may be performed for a set of points, such that the average distance of all points in the set from corresponding cluster-means is the lowest possible. The K-MEANS algorithm is described in greater detail at https://en.wikipedia.org/wiki/K-means_clustering, which is hereby incorporated by reference in its entirety herein. In the context of scoring attributes, the K-MEANS algorithm may be modified as follows.

First, dates may be translated to a unified time unit having numerical values, for example, according to the Unix epoch timestamp, also known as POSIX time, which is the number of seconds that have elapsed since midnight Coordination Universal Time (UTC), Jan. 1, 1970, not counting leap seconds.

For a criterion attribute field taking on non-negative numerical values, a sample average $\mu_j$ and variance $\sigma_j^2$ of the values in a criterion field $c_j$ may be computed over all $|R|$ number of records. Denote the distance of a value x in $c_j$ from $\mu_j$ by $d(x, \mu_j)$, and assume this random variable is distributed according to a Gaussian Normal Distribution $\mathcal{N}(\mu_j, \sigma_j^2)$. Remove point outliers with $d(x, \mu_j) > \text{maxD}_j$, where $\text{maxD}_j$ is a tolerance parameter to exclude extreme values with less frequent occurrences in the criterion attribute field $c_j$.

For a criterion attribute field $c_j$, let $C_j$ be the set of attribute values which remain after the filtering or outlier removal process. Denote the new sample average computed without the outliners by $\mu'_j$. This value may be used as the center of mass or centroid for the criterion attribute field $c_j$. Define a score function $$s_{c_j}(r) = \frac{1}{\pi}[2 \arctan(x/\mu'_j)],$$

where x is the value of attribute field $c_j$ in record $r \in R$. This attribute score function $s_{c_j}(r)$ has three properties. First, this function is normalized, as the image of the function is bounded between 0 and 1 for all non-negative values of x. Second, this function is positively monotonic. Third, the exact value of the function may be further controlled by using another system parameter $\text{cScore}_j$ as a scaling factor, so that for a record with a value of $\mu'_j$ in the criteria field $c_j$, the attribute score is $\text{cScore}_j$.

So far, numerical attribute values handled are assumed to be non-negative. For negative values, a minimum value may be determined, and used as an offset in all calculations.

Another attribute field type is strings, without any mappings to enumerations. In this case, an enhancing aggregate function may be used, represented as a graph, with each edge in the graph having a weight of at least 1. The weight of an edge may represent the distance between the edge's two endpoints, where each endpoint may represent a sample value for a criterion attribute field $c_j$. Since such a graph translates into a numerical distance function, the rest of the calculations stay the same as for numerical values. In some embodiments, string-type attribute values may be text-normalized to unify variations of the same string, and to preserve database space. For example, dashes may be removed, letter casings may be unified, and abbreviations may be translated.

Scoring a Record

After determining attribute scores $s_{c_j}(r)$ for each record $r \in R$, and criterion attribute fields $c_j \in C$, a record score $s(r)$ may be computed for the record r as a whole, by weighting individual attribute scores using a weight vector $w=[w_1, w_2, w_3, \ldots]$, where $\Sigma w_j = 1$. This weight vector w defines the importance of each criterion attribute field in comparing a record to the other records. For example, an "opportunity amount" attribute field may weight more than a "sign-up date" attribute field. Correspondingly, record score $s(r)$ may be computed as an inner product $s(r) = w^T v$, where vector $v=[s_{c_1}(r), s_{c_2}(r), s_{c_3}(r), \ldots]$ denotes a vector of attribute scores over attribute fields $c_j \in C$, for record $r \in R$. In the case where $s_{c_j}(r)$ is normalized, record score $s(r)$ takes on a value between 0 and 1, inclusive, as well.

Determining Lead Profile Attribute Values to Generate a Lead Profile

Recall that a lead profile may comprise a set $P=\{p_1, p_2, \ldots, p_i \ldots\}$ of property attribute fields, where P maybe be a proper subset of the set of all attribute fields A, or may equal to A. For each value y of a property field $p_i \in P$, a corresponding property score may be computed over all lead records as $p_{i,y} = \Sigma_{r \in R, p_i(r) = y} s(r)$. In other words, the property value score $p_{i,y}$ for a property value y of a property attribute field $p_i$ may be a summation of record scores $s(r)$ over all records that has the value y for its property attribute field $p_i$. In some embodiments, this summation may be normalized, or weighted.

With individual property value scores $p_{i,y}$ computed for a property attribute field, a sorting operation may be performed, over the property value scores to return the top t property attribute values, where t is a system parameter which defines how many targeting values are to be returned from the algorithm. Note the returned values are not necessarily continuous or successive.

Learning the System Parameters

Several system parameters are described above. Such system parameters may be set manually, or automatically by METADATA, with default values pre-configured or predetermined.

In some embodiments, the parameter t may be set or configured by the system user, or a METADATA operator, depending on the desired number of candidate leads that may match the generated lead profile. The parameter $\text{maxD}_j$ may be configured using a machine learning technique based on the Newton-Raphson method, where this bound or limit may be tested across many leads or accounts in accordance to the performance of $\mu'_j$ as a center of mass for the criterion attribute field $c_j$. Each $c_j$ may have a different $\text{maxD}_j$ parameter as its value depends on the logical meaning of $c_j$. The parameter $\text{cScore}_j$ may be learnt in a similar way, for each $c_j$.

The weight vector w may be configured through user or operator input, or may be learnt automatically through machine learning. For example, in some embodiments, the Newton-Raphson method may first be applied in the same way as above. As the amount of enriched data for a set of values in a property field $p_i$ grows, a classical K-MEANS algorithm may be applied, where each data point is a profile of a client that was already calculated in the past. A distance function $\text{dist}(h_1, h_2)$ may be defined between two such profiles $h_1, h_2$. In one example, the Euclidean distance may be used, where $\text{dist}(h_1, h_2) = \sqrt{\Sigma d(p_i(h_1), p_i(h_2))^2}$, and d is a distance function in accordance to the type of the field $p_i$, similar to that for the criterion attribute fields. Given a new client h and an existing client h' where dist(h, h')≤minDist, minDist being a system parameter learnt under the same Newton-Raphson method, a new weight vector w' may be computed for the new client as w'=dist(h, h')·w. This process enables the machine learning of the weighted vector w in accordance to similarities between two profiles.

ICP Generation Example 1

In this subsection, a very simple example is provided to illustrate the lead profile generation process above. Assume three lead records with closed opportunities are provided. Each lead may have five attribute fields: name, industry, revenue, age, and opportunity amount. The name and industry attribute fields may be of the type string, while the other three attribute fields may be of the type number. Revenue and opportunity amount may be viewed as criterion attribute fields, to compute scores for each record, while company, revenue, age, and opportunity amount may be viewed as property attribute fields, and an ICP comprising these four property attribute fields may be generated based on the three lead records.

ICP Generation Example 2

In this subsection, another example is provided for establishing an ICP. In this example, a METADATA system may connect to a user's CRM account such as under Salesforce.com to "reverse engineer" past customer data to identify one or more ideal customer profiles (ICPs).

More specifically, the METADATA system may first run an internal report within the CRM to identify all leads or contacts that are qualified. A qualified lead may be defined as a lead associated with deals having a high probability of being closed and won by a METADATA user. In some embodiments, a qualified lead is one for which associated opportunity value is greater than 0. In some embodiments, a lead is considered qualified as long as there is a potential future opportunity with Amount >$0, even if any past opportunity for the lead was closed and lost. The opportunity amount may be understood by some simple examples. Suppose that a contact in the CRM system is a student who went to a seminar of the user in search of internship opportunities. Such a student contact would have an opportunity amount of $0, because there is no intention of any business transaction in the foreseeable future. Another contact might be a past customer who had a closed and won deal worth $1M. The opportunity amount would then be $1M, since this past customer may do business with the system user again in the future. Moreover, a past customer with a deal worth $50 k that was closed and lost, may still be a future customer, and so the opportunity amount would be $50 k. Therefore, opportunity amount for past customers would be greater than zero in most cases. In another embodiment, the student in the aforementioned example may be considered to have a small non-zero opportunity amount automatically in three years, because assuming he or she has graduated, he or she may be in a position to make decisions for his or her firm, and demand business service from the system user. Yet other embodiments may define the opportunity amount differently. For example, the following pseudo SQL query may retrieve from a database all leads associated with positive opportunities.

PSEUDO QUERY: SELECT*FROM LEADS_TABLE
  INNER JOIN OPPORTUNITIES_TABLE
  WHERE OPPORTUNITIES_TABLE.AMOUNT>0

The METADATA system may pair the returned data table with third-party enrichment data by identifying as many attributes as possible about the leads and the companies they work for. Some exemplary third-party data sources include paid data sources such as Datanyze and ZoomInfo, and freely available ones such as the public web.

The METADATA system may then analyze the augmented dataset to generate insights on the assembled data, according to processes described above. In one example, different groups or clusters within the dataset may be determined by running statistical functions such as K-MEANS. In another example, the system may identify signals that correlate most to opportunity.amount AND opportunity.status=won, by running statistical functions such as decision tree analysis, regression analysis, or random forest. Boolean variables may be used to indicate whether a customer prospect became a real customer in one embodiment. Such prospects may in another embodiment be labeled with a probability value instead of a Boolean. Lead scores or weightings may be further applied based on such variables as opportunity amounts, and opportunity status, where opportunity status may include closed and won, closed and lost, etc. In some embodiments, the statistical analysis is based on machine learning of profile attributes of leads with high lead scores, and profile attributes of leads in the test target groups corresponding to high campaign scores.

Targeted Advertising Campaigns

FIG. 8 is a flowchart illustrating a process for generating opt-in business leads utilizing targeted marketing campaigns, where an ICP is generated from existing leads, according to one embodiment of the present invention.

In this embodiment, upon initiation at step 810, the METADATA system retrieves a list of N leads with p properties from an external data source at step 815. The data source may be, for example, Salesforce, or simply a csv file. To enrich the retrieved leads, for each of the N leads, at step 820, additional data are retrieved from another data source, and added at step 825 as the (p+1)-th, ... q-th attribute fields. The system may then identify one or more ICPs through a profiling process, by statistically analyzing the retrieved leads at steps 830 and 835. At step 830, for each of the q properties, histograms may be made, for a total of q histograms, and Q modes or Q top property values may be determined. Such modes are the property values that occur with the highest frequency in the existing pool of leads, and may be used as the corresponding attribute value for the desired ICP. At step 835, a vetting process may be conducted, where a system user may be asked to approve the Q top property values for the ICP.

Next, at step 840, a custom audience search process may be performed, where M new leads each with k properties may be retrieved from one or more data sources, where the M new leads match the ICP with a certain match rate, and where the ICP is made up of the Q top property values. These new leads are lookalikes of the initial N candidate leads. Enrichment of the M new leads may be performed at step 845, where additional properties may be added so that each of the M new leads now have l attributes, where l≥k.

With the new leads, the system may generate test marketing campaigns or micro-campaigns at step 850, where subsets of the M new leads may be targeted. With campaign landing pages specified by landing page properties 865, campaigns may be uploaded at step 870 to ads service providers or channel advertising partners, with landing pages and the target leads having specified attributes. Lead submissions and feedbacks are received from the landing pages at step 875, and multiple updates may be conducted. When a new lead submits information on the landing page at step 875, the campaigns engine may updates the ads service and the system upon a clicking of a submission button.

In some embodiments, lead submissions are analyzed and locally scored. In some embodiments, lead submissions are uploaded to the client's CRM system. At step 890, data sources may be accessed to store the new leads, as well as lead responses. Such data sources may refer to internal METADATA databases, system user's own databases or CRM system, or external CRM systems. Although the overall process shown in FIG. 8 terminates at step 895, acquired leads may be further tracked over subsequent time periods, where opportunities closed, and amounts won may be recorded to indicate the quality of a lead. Acquired leads or closed leads may also be further used by step 815 to fine-tune and further refine the ICP for candidate lead generation. Moreover, in some embodiments, landing page properties may be updated according to the result of the test campaigns.

Below is yet another exemplary process for targeted advertising and ICP optimization, in one embodiment of the invention.

Connecting to Third-party Platforms

As previously discussed, third-party platforms may serve as data sources or channel advertising partners in the opt-in business lead generation process. Exemplary third-party platforms include Facebook, Google AdWords, Salesforce, and Hubspot. These may serve as data sources including lead data source, enrichments data sources, and the like. Other data sources include, but are not limited to, the following. Bracketed items below indicate the types of data that may be obtained from the respective data source.

LinkedIn (Contacts)
FullContact (Contacts+Companies)
ClearBit (Contacts+Companies+Lookalikes)
Pipl (Contacts)
ZoomInfo (Lookalikes)
BuiltWith (Companies)
LeadSift (Contacts)
WhitePages (Contacts)
GlassDoor (Companies)
HG-Data (Companies)
LeadFerret (Lookalikes)

Creating a New Campaign

FIG. 9 is an exemplary Campaign Setup page 900, according to one embodiment of the present invention. An exemplary test campaign form 910 may contain campaign fields 920 for, for example, duration and budget information, targeting fields 930 for, for example, targeting sets and choices of landing pages, and creative fields 940 for, for example, ad headlines, as well as ad creative fields 950 for uploading additional files for the visuals. Note that this is an illustrative example not meant to be restrictive in the kinds of information that may be specified on a test Campaign Setup page.

Figure 10:
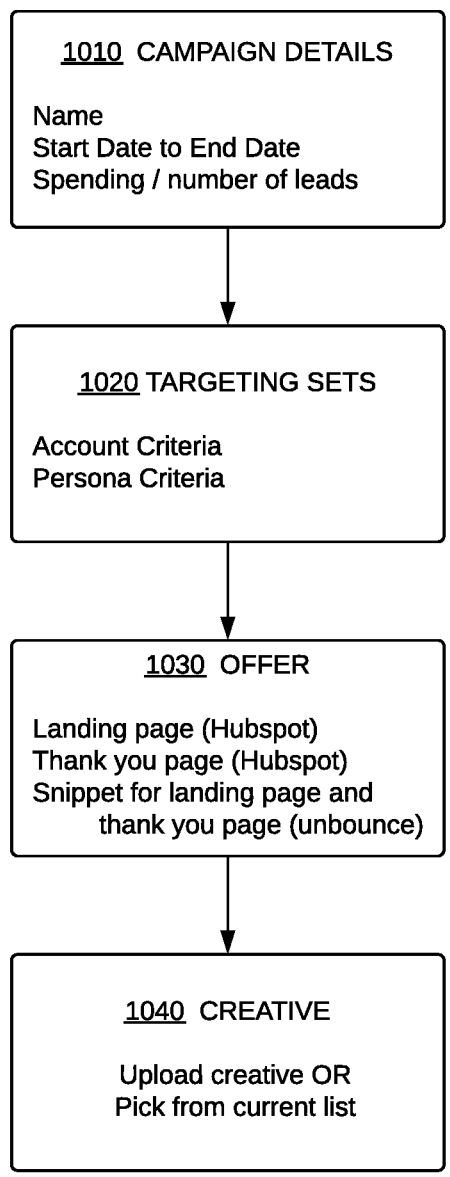
FIG. 10 illustrates an exemplary campaign flow, according to one embodiment of the present invention.

FIG. 10 shows an illustrative campaign flow 1000 by means of a campaign creation wizard, which helps the user to define new ad campaigns for one embodiment of the invention.

In this embodiment, the METADATA platform may consist of the following types of pages: Dashboard such as Campaign details page 1010; Targeting Sets page 1020; Campaigns pages such as Offer page 1030; and Creative page 1040.

In addition to campaign details such as name, start date to end date, and budgeted spending per lead, Dashboard Page 1010 may also show important Key Performance Indicators (KPIs), such as the average cost per clicks for currently existing campaigns not run by the system, or the average cost per click for campaigns that the system runs. Another important KPI may be the display and/or comparison of quantitative measures along the campaign chain, including Spend, Impressions, Clicks, Conversions, and Dollar Opportunity.

Defining Targeting Sets

Targeting Sets page 1020 may show account attribute criteria and persona attribute criteria, for configuring or specifying target sets of candidate leads. The user may have the ability to add and remove target set conditions. The process of setting up a target set may have two life cycle phases: In Process, and Done. In some embodiments, Targeting Sets page 1020 may comprise forms for the user to define a desired target set by specifying targeting set conditions for company and persona attributes. For example, company targeting attributes may be configured to have revenue values ranging between $1M, $5M, $50M, $250M, and the like. Similarly, persona targeting attributes may be configured by user input of attributes such as seniority. In some embodiments, multiple target sets may be derived from the target set conditions, by allowing the user to configure different combinations of attribute conditions.

In some embodiments, once company and persona targeting set conditions are configured by the user, the METADATA system may display corresponding CRM or Salesforce analysis of the targeting sets thus defined, and ask the user to approve or go back and change the targeting set conditions. In some embodiments, a validation step may be provided, where the METADATA system may show the user a number of contacts that match each combination of targeting set conditions previously configured, and ask the user to validate that these are the personas the user would like to target. If the user does not validate, he or she may be asked to change the targeting set conditions.

Testing the Campaigns

The system may repeat the process of ICP generation and test campaign creation, while also further optimizing a cost per lead (CPL) metric by testing the campaign offers using A/B testing, indirect testing, probabilistic testing, and comparative testing.

In one example, the system may A/B tests the campaign offers and advertising channels to see which test campaign has a better response. In another example, the system may compare campaign responses of target groups generated by the system and target groups generated by advertising channels. By doing so, target groups with the minimum CPL and the highest quality leads may be selected. Similar comparisons may be performed on target groups formed by other criteria. In this way, the quality of the target groups may be scored, and corresponding optimal campaign strategies may be determined. In yet another example, where comparative testing is deployed, more than one target groups may be served with a given landing page, and the campaign trials scored based on candidate lead voluntary opt-in weights. Another comparative test would be to compare target groups or campaigns based on a weighted score formed from match rate signals of the candidate leads within a target group and their voluntary opt-in weights after obtaining campaign feedback.

Generating Opt-in Business Leads

After performing the test advertising campaigns, one or more main advertising campaigns may be sent to the candidate leads matching profiles of high-quality test target groups. Typically, test advertising campaigns are smaller than main advertising campaigns, or are targeted to smaller groups. Testing on a small subset of the candidate leads and targeting the rest based on the testing results may bring great savings in advertising costs paid to channel partners, and may allow for the specific targeting of micro-criteria and fine-tuning of the generation of high quality leads. The system may receive responses from candidate leads during the main advertising campaign, and may generate opt-in business leads by selecting from the candidate leads those who responded affirmatively to the main advertising campaigns.

FIG. 11 is an illustrative flowchart for a process to generate opt-in business leads, according to one embodiment of the present invention. Upon initialization at step 1110, the METADATA system retrieves an ideal customer prolife (ICP) personifying an ideal customer at step 1120, the ICP comprising multiple ICP business attribute fields and multiple ICP persona attribute fields, where the ICP persona attribute fields identify one or more personal roles within a company identified by the plurality of ICP business attribute fields. At step 1130, candidate leads are generated by retrieving candidate leads from one or more lead data sources, where each candidate lead matches the ICP, and enriching each candidate lead with enrichment data retrieved from one or more enrichment data sources. At step 1140, one or more test campaigns are generated, where each test campaign is associated with a campaign cost, one or more channel advertising partners, one or more landing pages, and a group of test leads, where each associated group of test leads is a subset of the candidate leads. At step 1150, each test campaign is directed to the associated group of test leads, using one or more of the associated channel advertising partners. At step 1160, feedback information is received on each test campaign from the associated group of test leads, through one of the associated landing pages, where each test lead who responds affirmatively to one of the associated landing pages is marked as an acquired lead. At step 1170, a test campaign score is computed for each test campaign, based on the number of the acquired leads acquired through the test campaign, and a campaign cost per lead (CPL). At step 1180, a targeted advertising campaign is generated and directed to the candidate leads, where the targeted advertising campaign comprises one or more micro-campaigns, where each micro-campaign replicates a test campaign with a test campaign score exceeding a campaign score threshold, and where each micro-campaign is directed to a subset of the candidate leads that match a profile of the test lead group associated with the replicated test campaign. At step 1190, opt-in business leads are generated by selecting candidate leads that respond affirmatively to the targeted advertising campaign, before the overall process terminates at step 1195.

In some embodiments, instead of terminating at step 1195, the process may continue iteratively, where the ICP is updated based on the acquired or opt-in leads, and the overall process reiterated to produce better targeted campaigns.

Targeted Advertising Campaign Generation Based on Historical Data

In FIG. 9 which shows an exemplary campaign setup page and FIG. 10 which provides a corresponding illustrative campaign flow, user input may be required in generating targeted advertising campaigns, where the user specifies campaign parameters such as duration and budget information, targeting fields, creatives and the like. An experienced user can define new campaigns without much trial and error, but automatically recommending targeted advertising campaigns by automatically populating form fields in FIG. 9 to provide default campaign parameters for a user to use or to choose from can help improve both the efficiency and effectiveness of campaigns generation. In various embodiments of present invention, such recommended targeted advertising campaigns may be generated based on historical data collected over current running or past advertising campaigns, for the desired client or for similar clients.

More specially, machine learning (ML) or artificial intelligence (AI) modules may be deployed within the METADATA server, where a recommendation engine on auto-pilot makes assumptions based on past information from marketing automation and advertising accounts, and proposes campaigns automatically. Campaign recommendations or templates may thus be provided to the user, optionally for additional user configuration before corresponding campaigns may be initiated. Currently running campaigns may be scanned through periodically, such as hourly, daily, or weekly, and changes may be proposed, for a user to accept or reject, or for automatic update and decision making by the METADATA server, possibly by a dedicated AI module in the form of a recommendation engine.

As a simple example, the METADATA server may scan Salesforce database and create sales acceleration audiences for limbo opportunities, (i.e., more people within the ICP of current accounts/clients with open opportunities). Processes that may be automated by the METADATA server include, but are not limited to, automatically suggest new audiences based on customer's competitors, automatically suggest new audiences based on customers' buyer intent categories, automatically scan customer or resource website sections to add resources to the METADATA library, and automatically suggest different campaign boost based on existing campaigns in marketing automation. For example, if a webinar invite has received 53 registrants, the user may type in a registration goal, and METADATA may optimize the campaign to achieve this goal. The METADATA server may also record historical metrics obtained without AI-based automation, including click-through rate (CTR), Cost per Marketing-Qualified Lead (CMQL), Cost per Sales-Qualified Lead (CSQL), Cost per Opportunity (COPP), Cost per Lead (CPL), and percentage penetration into names accounts, to show attribution.

As an illustrative example, FIG. 12 is a flowchart 1200 for a process to generate targeted advertising campaigns, according to one embodiment of the present invention. Upon initiated at step 1210, historical data may be received at step 1220 on one or more experiments. An "experiment" may refer to any targeted advertising campaign, completed in the past, currently running, or designed for the future. An experiment provides insights into the effectiveness of particular campaign setting or configurations on a set of candidate leads. An experiment may be a micro-campaign for validating one or more experiment parameters, and a main campaign may comprise one or more experiments selected from a candidate set of experiments.

At step 1230, a prediction engine is used to determine a prediction of a goal metric by finding a pattern in a historical metric that influences the goal metric, where the historical metric is included in the historical data. In other words, one or more historical metrics that measure the effectiveness of past campaigns may be studied to predict the value of a goal metric. Thus, the goal metric may be one of the historical metrics, or a function of the one or more historical metrics. The goal metric is a global metric that summarizes the performance of all historical data considered, and a value predicted from historical metrics may in turn be used to determine its correlation with experimental parameters, enabling further prediction of the goal metric from the experimental parameters directly. In some embodiments, the goal metric may be specified by the user. In some embodiments, the goal metric may be chosen by the recommendation engine, for example by using supervised learning based on historical training data, or by using unsupervised learning techniques.

At step 1240, the prediction engine further determines correlations between experimental parameters and the goal metric. At step 1250, the prediction engine trains two or more experimental parameters models for the goal metric, based on the correlations between the experimental parameters and the goal metric. At step 1260, a campaigns engine is used to generate one or more new experiments, each associated with a prediction of the goal metric based on the two or more experimental parameter models. At step 1270, the campaigns engine is used to generate a targeted advertising campaign comprising a selected number of the new experiments.

In this disclosure, "historical data" comprises data collected from campaigns initiated in the past, where such past campaigns may still be running, or already terminated. Running and terminated experimental campaigns may be considered separately in some embodiments of the present invention. Inference or training from historical data allows learning algorithms to generalize from existing campaigns, extract hidden structures and correlations between campaign parameters and performances, and recommend new campaigns for improved results.

Figure 13:
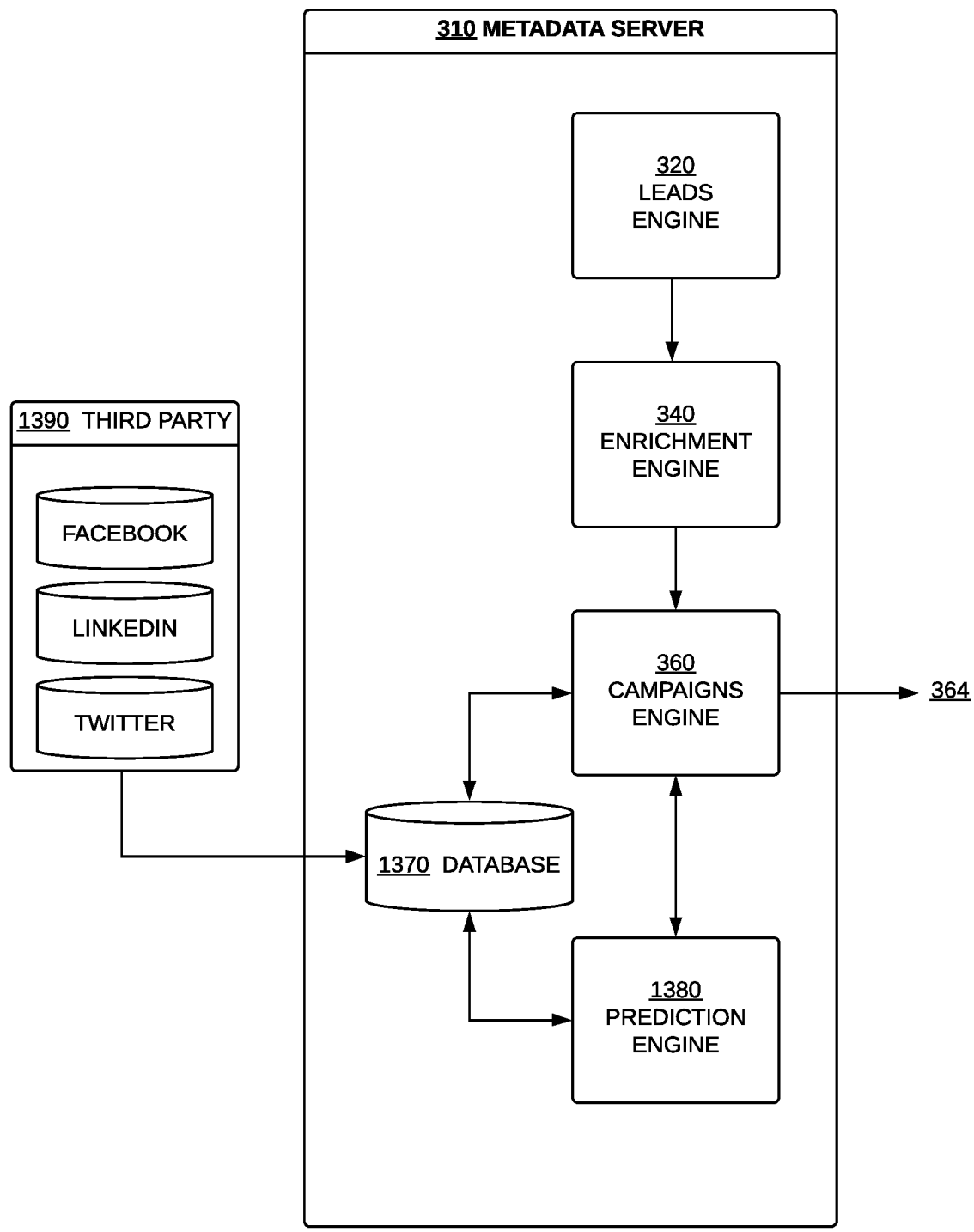
FIG. 13 is an illustrative software architecture diagram for targeted advertising campaigns generation, according to one embodiment of the present invention.

FIG. 13 provides an illustrative software architecture diagram 1300 for targeted advertising campaigns generation, utilizing the process shown in FIG. 12, according to one embodiment of the present invention. In this embodiment, METADATA server 310 comprises an additional module, a prediction engine 1380, for analyzing historical data stored in internal database 1370, including those imported or retrieved from third party databases or partners 1390 such as Facebook, LinkedIn, and Twitter. Prediction module 1380 may implement one or more supervised or unsupervised machine learning algorithms for extracting dependencies and correlations among campaign metrics and campaign parameters. In some embodiments, prediction engine 1380 is also called a recommendation engine. In some embodiments, the collection of campaigns engine 360, prediction engine 1380, and database 1370 is viewed as a recommendation engine for automatically suggesting targeting advertising campaigns.

Parameters Suggestion for Performance Improvements

A running campaign may be evaluated and performance improved iteratively. For example, the running campaign may be evaluated by the value of a goal metric, such as Cost Per Lead (CPL), or Click-Through Rate (CTR). A modification to one or more campaign parameters such as custom audience, bid, daily budget, budget, duration, and channel, may be made to maximize a return of the campaign. For example, a successful experiment may be updated or relaunched with a bigger budget and a lower bid. A suggestion may also be made to terminate a running experiment, based on a current or a predict return In some embodiments of the present invention, the METADATA system may generate recommendations of new experiments for a METADATA client, based on historical data collected from the same client, one or more other METADATA clients, the client's competitors, or one or more B2B companies having characteristics similar to that of the METADATA client. The METADATA system may examine recent historical data to generate a new experiment with optimized parameters including creatives, landing page, and/or lead generation form. For example, if data from a past Experiment A indicates that a particular creative has performed successfully and data from a past Experiment B indicates that a particular custom audience converted well, these two components may be combined into a new experiment. This determination of metrics used for measuring the effectiveness of an experiment and corresponding campaign parameters may utilize a machine learning module as part of the recommendation engine, as disclosed in more details below.

Historical Data

As discussed previously, historical data is a data set that includes data collected from one or more campaigns initiated in the past. Table 1 provides an illustrative example of a historical data set, where the first four data rows (i.e., daily_budget, bid, start_date, and end_date) are retrieved from an Experiment 1, and the remaining (i.e., clicks, impressions, conversions, actual_daily_spent, ctr, cpl, date) are from an Experiment 2. Only four columns are provided for illustrative purposes. The table may have as many columns as the number of days of historical data collected from all experiments.

TABLE 1

Exemplary Historical Data

| experiment_id | 1 | 1 | 2 | 2 |
|---|---|---|---|---|
| daily_budget | $50 | $50 | $40 | $40 |
| bid | $20 | $20 | $10 | $10 |
| start_date | Dec. 12, 2017 | Dec. 12, 2017 | Feb. 2, 2018 | Feb. 2, 2018 |
| end_date | Dec. 12, 2018 | Dec. 12, 2018 | Mar. 3, 2018 | Mar. 3, 2018 |
| clicks | 10 | 2 | 20 | 25 |
| impressions | 20 | 10 | 100 | 250 |
| conversions | 1 | 0 | 5 | 10 |
| actual_daily_spent | $10 | $0 | $50 | $80 |
| ctr | 50 | 20 | 20 | 10 |
| cpl | 10 | 0 | 10 | 8 |
| date | Jan. 1, 2018 | Feb. 10, 2018 | Apr. 2, 2018 | May 2, 2018 |

The historical data about past experiments may be used to train a machine learning model. For example, based on the data set shown in Table 1, two regression models may be trained to predict values of two goal metrics, CTR, and CPL, based on historical data from previous days.

In some embodiments, a lower threshold may be set for the amount of historical data necessary. For example, at least 5 days of experiment data may be needed for the regression models to be accurate. In addition, there may be requirement on when such historical data are collected, such as over consecutive days, inconsecutive days at certain intervals, for a particular duration, after a number of days have elapsed since the initiation of an experiment, and the like.

In some embodiments, additional data may be imported from third-party databases such as from LinkedIn and Facebook, and combined with historical data already available in the METADATA system.

Goal Metric Prediction and Parameter Model Training

In some embodiments, a separate prediction engine is utilized to first predict the goal metric from the historical data, by finding a pattern in historical metric data that have influence on the goal metric. One or more predictions may be made on the goal metric, which in turn may be used by the prediction engine to determine correlations between experimental parameters and the goal metric. Experimental parameter models may be trained based on the correlation. For stable prediction results, two or more separate parameter models may be trained per goal metric. For example, when CTR is taken as the goal metric, two parameter models may be trained to predict impressions and clicks. Having two separate models enable the prediction engine to handle cases where high impression is achieved with little or no clicks. Similarly, when CPL is taken as the goal metric, actual daily spend value and conversions may be predicted via separate models.

Campaign Parameter Suggestion

A new experimental campaign may be suggested or recommended in terms of campaign parameters. A Bayesian search technique may be utilized to find experiment parameters to provide better predictions for the goal metric. For example, for Experiment 1 shown in Table 1, when a current bid is $1.2, a predicted CTR may be 56. A suggestion model may be run on an increased bid of $1.25, and the result may indicate that a boosted gain in CTR from 56 to 59.

In some embodiments, historical data used for goal metric prediction and campaign parameter suggestion includes one or more of budget, bid, duration, experiment ID, clicks, impressions, conversions, actual daily spend, custom audience and creatives. A separate model may be constructed per client account to provide a personalization to goal metric prediction and experimental campaign parameter suggestion. Machine learning models such as recurrent neural networks can be deployed to determine the correlations among the aforementioned variables.

In predicting a goal metric such as CTR or CPL, quantitative or numeric dependencies may be determined using known analytical and statistical tools and algorithms. For example, how bid, daily budget, and duration of an experiment influence the CPL can be determined through regression analysis. However, more complicated parameter sets and qualitative campaign parameters such as custom audience parameters, creative's and lead gen form's images, creative's and lead gen form's texts can play important roles in goal metric prediction and new experiment generation as well. Prediction engine 1380 may apply deep learning algorithms to extract meaningful features and/or embedding from these entities, for extending an existing predictive model to encompass their predictive power. For example, prediction engine 1380 may scan and use historical creatives from existing and other customers, similar industries, or similar target audiences. If a first cyber security company has been successful because its creative shows a person with glasses, then a similar image of the person with glasses may be used for a second cyber security company as well. In some embodiments, third-party tools may be integrated to process the historical data. For example, images of different sizes may be automatically generated by the METADATA system for different channels. Several advantages may be achieved by utilizing extracted features of such input parameters. First, a single parameter model may be preserved for each goal metric, since feature extractors may be trained over data from an entire database. Second, historical data imported from their party databased may be used for training the parameter models. As there are no binding internal IDs, and only contextual features are used, a large amount of third-party data may be utilized by the METADATA system.

Experiment Selection for Campaign Generation

Once new experiments are created, the METADATA system may evaluate each individually to select one or more for generating a main targeted adverting campaign. In an illustrative example, a client Bob Johnson wants to launch a campaign for a new TV product. Bob has two descriptions (TV cool, TV awesome), three creatives (black TV, green TV, white TV) and two custom audiences (engineers and doctors). Numerous experiments are possible for creating a desired campaign for Bob. In Table 2, all possible permutations of experiment parameters are listed, not taking into account channel, bid, budget, duration. A machine learning model in a campaigns engine may score each parameter set individually and choose the best ones for this campaign. For example, based on the ranking of the predicted goal value, the top N experiments may be chosen for Bob's campaign, where N may be determined based on budget or other constraints. Similarly, in some embodiments, not all parameters permutations are considered in the first place, subject to known or user-specified constraints.

Machine Learning (ML) and Artificial Intelligence (AI) Module Architectures

Various machine learning (ML) and artificial intelligence (AI) algorithms, architectures, and approaches are within the scope of the present invention. In one embodiment, a machine learning algorithm uses a random forest algorithm, a specialized machine learning algorithm. Random forests use a multitude of decision tree predictors, such that each decision tree depends on the values of a random subset of the training data, which minimizes the chances of overfitting. In one embodiment, the random forest algorithm is implementation as described in Leo Breiman, *Random Forests*, Machine Learning, 45, 5-32, 2001, Kluwer Academic Publishers, Netherlands, Available at doi.org/10.1023/A:1010933404324, which is hereby incorporated by reference in its entirety herein as if fully set forth herein. Random forest is only one illustrative machine learning algorithm that is within the scope of the present invention, and the present invention is not limited to the use of random forest.

Other machine learning algorithms, including but not limited to, nearest neighbor, decision trees, support vector machines (SVM), Adaboost, Bayesian networks, various neural networks including recurrent neural networks and deep learning networks, evolutionary algorithms, and so forth, are also within the scope of the present invention.

As noted, embodiments of devices and systems (and their various components) described herein can employ artificial intelligence (AI) to facilitate automating one or more features described herein (e.g., providing ICP recommendations, providing test experiment recommendations, and the like). The components can employ various AI-based schemes for carrying out various embodiments/examples disclosed herein. To provide for or aid in the numerous determinations (e.g., recommend, determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, $z=(z1, z2, z3, z4, \ldots, zn)$, to a confidence that the input belongs to a class, as by $f(z)=confidence(class)$. Such classification may employ a probabilistic and/or statistical-based analysis (e.g., factoring into the analysis utilities and costs) to determinate an action to be automatically performed. Another example of a classifier that can be employed is a support vector machine (SVM). The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

TABLE 2

Candidate Experiments

| Experiment ID | Custom audience | Creative's image | Creative's text | Goal value | Predicted goal value | Rank |
|---|---|---|---|---|---|---|
| 1 | Engineers | Black TV | TV cool | 11 | 13 | 1st |
| 2 | Engineers | Black TV | TV awesome | 10 | 11 | 2nd |
| 3 | Engineers | Green TV | TV cool | 2 | 1 | 10th |
| 4 | Engineers | Green TV | TV awesome | 2 | 2 | 8th |
| 5 | Engineers | White TV | TV cool | 5 | 7 | 5th |
| 6 | Engineers | White TV | TV awesome | 6 | 6 | 6th |
| 7 | Doctors | Black TV | TV cool | 7 | 7 | 4th |
| 8 | Doctors | Black TV | TV awesome | 6 | 7 | 3th |
| 9 | Doctors | Green TV | TV cool | 1 | 1 | 11th |
| 10 | Doctors | Green TV | TV awesome | 1 | 0.5 | 12th |
| 11 | Doctors | White TV | TV cool | 2 | 3 | 7th |
| 12 | Doctors | White TV | TV awesome | 2 | 2 | 9th |

Illustrative Case Study: Concurrent

To demonstrate the effectiveness of methods and system as disclosed herein, a case study is presented next.

Concurrent, a business in Big Data application infrastructure, wanted to deliver their live product demo to clients in a target list of companies, including accounts that may be been overlooked before, as well as new targets ready to engage with sales. The goal is to accelerate Concurrent's marketing reach and acquire more customers faster while maintaining or reducing customer acquisition costs.

To achieve the intended goal, Concurrent used METADATA to generate a very high quality lead flow. Leads thus generated were of the highest quality Concurrent has seen up to date.

In addition to the quality of leads coming in, Concurrent was able to achieve significant advertisement cost savings by optimizing their reach via multiple channels, getting the same person to engage with their message for a fraction of the cost, thus allowing a high marketing return on investment (ROI).

In a three-week campaign, 500 accounts were targeted, and as many as 161 converted. METADATA delivered a three-fold increase in ROI when compared to previous campaigns, engaging over 33% of those accounts with Concurrent product demo and creating 4 new opportunities that week alone. In addition, METADATA drove 48% increase in net new conversions within the span of the promotion, and a 3.7 times increase in clicks-through rates when compared to Concurrent's best performing campaign in the past.

Implementation of the Present Invention

Figure 14:
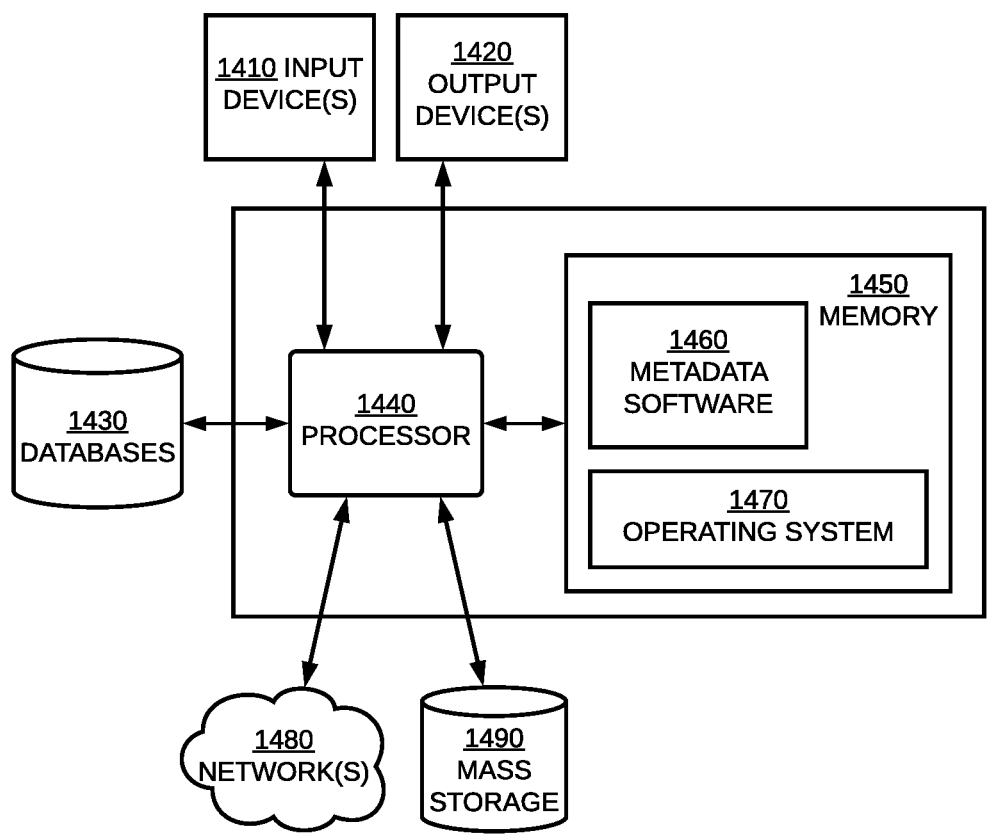
FIG. 14 is an illustrative hardware architecture diagram of a server for implementing one embodiment of the present invention.

The present invention may be implemented using server-based hardware and software. FIG. 14 shows an illustrative hardware architecture diagram 1400 of a server for implementing one embodiment of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor 1440 coupled to a memory 1450. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 1410 and outputs 1420 for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices 1490, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface one or more external SQL databases 1430, as well as one or more networks 1480 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 1470, and executes a METADATA software application 1460, with components, programs, codes, libraries, objects, modules, etc. indicated collectively by reference numerals to perform the methods, processes, and techniques described above.

Figure 15:
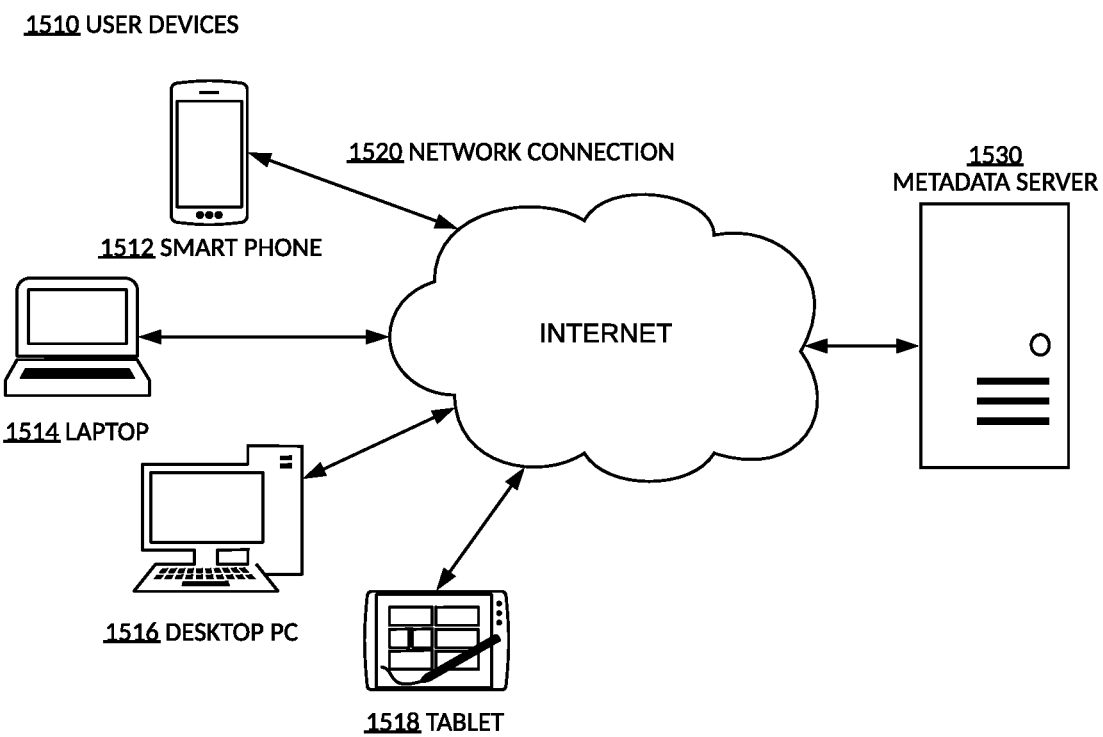
FIG. 15 is an illustrative system architecture for implementing one embodiment of the present invention in a client server environment.

The present invention may be implemented in a client server environment. FIG. 15 shows an illustrative system architecture 1500 for implementing one embodiment of the present invention in a client server environment. User devices 1510 on the client side may include smart phones 1512, laptops 1514, desktop PCs 1516, tablets 1518, or other devices. Such user devices 1510 access the service of the METADATA system server 1530 through some network connection 1520, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention. In some embodiments, connections to CRMs and/or marketing automation systems may be established via some network connection between METADATA server 1530 and the respective systems.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method executable by a hardware processor which executes program code from a non-transitory storage medium, the method for generating targeted digital advertising campaigns for a business-to-business (B2B) company, comprising:
   retrieving historical data on one or more historical experiments, wherein each historical experiment is a past targeted digital B2B advertising campaign initiated in a past time;
   determining, using a prediction engine, a prediction of a goal metric by finding a pattern in a historical metric that influences the goal metric, wherein the historical metric is included in the historical data, and wherein the finding of the pattern in the historical metric comprises applying one or more machine learning algorithms on the historical data;
   determining, using the prediction engine, correlations between one or more experimental parameters and the goal metric, based on the prediction of the goal metric;
   training, using the prediction engine, one or more experimental parameter models for the goal metric, based on the correlations between the one or more experimental parameters and the goal metric;
   generating, using a campaigns engine, one or more new experiments, each new experiment associated with the goal metric, and based on the one or more experimental parameter models, wherein each new experiment comprises a new targeted digital B2B advertising campaign to be initiated in a future time, wherein the generating the one or more new experiments comprises retrieving a plurality of candidate leads from one or more lead data sources, and enriching the plurality of candidate leads with enrichment data retrieved from one or more enrichment data sources to generate a plurality of enriched candidate leads; and
   deploying, using the campaigns engine, a future targeted digital B2B advertising campaign by selecting a subset of the one or more new experiments comprising the plurality of enriched candidate leads.

2. The method of claim 1, wherein at least one of the one or more historical experiments is currently running.

3. The method of claim 1, wherein at least one of the one or more historical experiments was for the B2B company.

4. The method of claim 1, wherein at least one of the one or more historical experiments was for a company other than the B2B company.

5. The method of claim 1, wherein the historical data comprises creatives from one or more companies in an industry similar to the B2B company, or to a target audience similar to the B2B company.

6. The method of claim 1, wherein the experimental parameters are selected from the group consisting of bid, daily budget, and duration of experiment, and wherein the goal metric is selected from the group consisting of customer conversion rate, and budget.

7. The method of claim 1,
wherein the selected subset of new experiments collectively optimize the goal metric.

8. The method of claim 1, wherein the retrieving of historical data comprises scanning client websites for advertising content.

9. The method of claim 1, wherein the retrieving of historical data comprises scanning for competitor campaigns.

10. A system for generating targeted digital advertising campaigns for a business-to-business (B2B) company, comprising:
a processor; and
a non-transitory, computer-readable storage medium for storing program code, the program code when executed by the processor, causes the processor to:
retrieve historical data on one or more historical experiments, wherein each historical experiment is a past targeted digital B2B advertising campaign initiated in a past time;
determine, using a prediction engine, a prediction of a goal metric by finding a pattern in a historical metric that influences the goal metric, wherein the historical metric is included in the historical data, and wherein the finding of the pattern in the historical metric comprises applying one or more machine learning algorithms on the historical data;
determine, using the prediction engine, correlations between one or more experimental parameters and the goal metric, based on the prediction of the goal metric;
train, using the prediction engine, one or more experimental parameter models for the goal metric, based on the correlations between the one or more experimental parameters and the goal metric;
generate, using a campaigns engine, one or more new experiments, each new experiment associated with the goal metric, and based on the one or more experimental parameter models, wherein each new experiment comprises a new targeted digital B2B advertising campaign to be initiated in a future time, wherein to generate the one or more new experiments comprises program code to retrieve a plurality of candidate leads from one or more lead data sources, and enrich the plurality of candidate leads with enrichment data retrieved from one or more enrichment data sources to generate a plurality of enriched candidate leads; and
deploy, using the campaigns engine, a future targeted digital B2B advertising campaign by selecting a subset of the one or more new experiments comprising the plurality of enriched candidate leads.

11. The system of claim 10, wherein at least one of the one or more historical experiments is currently running.

12. The system of claim 10, wherein at least one of the one or more historical experiments was for the B2B company.

13. The system of claim 10, wherein at least one of the one or more historical experiments was for a company other than the B2B company.

14. The system of claim 10, wherein the historical data comprises creatives from one or more companies in an industry similar to the B2B company, or to a target audience similar to the B2B company.

15. The system of claim 10, wherein the experimental parameters are selected from the group consisting of bid, daily budget, and duration of experiment, and wherein the goal metric is selected from the group consisting of customer conversion rate, and budget.

16. The system of claim 10, wherein the selected new experiments collectively optimize the goal metric.

17. The system of claim 10, wherein to retrieve the historical data comprises program code to scan client websites for advertising content.

18. The system of claim 10, wherein to retrieve the historical data comprises program code to scan for competitor campaigns.

19. A non-transitory computer-readable storage medium for generating targeted digital advertising campaigns for a business-to-business (B2B) company, the storage medium comprising program code stored thereon, that when executed by a processor, causes the processor to:
retrieve historical data on one or more historical experiments, wherein each historical experiment is a past targeted digital B2B advertising campaign initiated in a past time;
determine, using a prediction engine, a prediction of a goal metric by finding a pattern in a historical metric that influences the goal metric, wherein the historical metric is included in the historical data, and wherein the finding of the pattern in the historical metric comprises applying one or more machine learning algorithms on the historical data;
determine, using the prediction engine, correlations between one or more experimental parameters and the goal metric, based on the prediction of the goal metric;
train, using the prediction engine, one or more experimental parameter models for the goal metric, based on the correlations between the one or more experimental parameters and the goal metric;
generate, using a campaigns engine, one or more new experiments, each new experiment associated with the goal metric, and based on the one or more experimental parameter models, wherein each new experiment comprises a new targeted digital B2B advertising campaign to be initiated in a future time, wherein to generate the one or more new experiments comprises program code to retrieve a plurality of candidate leads from one or more lead data sources, and enrich the plurality of candidate leads with enrichment data retrieved from one or more enrichment data sources to generate a plurality of enriched candidate leads; and
deploy, using the campaigns engine, a future targeted digital B2B advertising campaign by selecting a subset of the new experiments comprising the plurality of enriched candidate leads.

20. The non-transitory computer-readable storage medium of claim 19, wherein the selected new experiments collectively optimize the goal metric.

* * * * *